(12) United States Patent
Garcia

(10) Patent No.: US 10,401,244 B2
(45) Date of Patent: Sep. 3, 2019

(54) MAGNETICALLY ACTIVATED SENSOR

(71) Applicant: Jessica Garcia, Clifton, NJ (US)

(72) Inventor: Jessica Garcia, Clifton, NJ (US)

(73) Assignee: Kenobi Tech, LLC, Rutherford, NJ (US)

(*) Notice: Subject to any disclaimer, the term of this patent is extended or adjusted under 35 U.S.C. 154(b) by 223 days.

(21) Appl. No.: 15/372,442

(22) Filed: Dec. 8, 2016

(65) Prior Publication Data

US 2017/0176274 A1 Jun. 22, 2017

Related U.S. Application Data

(60) Provisional application No. 62/264,591, filed on Dec. 8, 2015.

(51) Int. Cl.
| | | |
|---|---|---|
| *G01L 5/00* | (2006.01) | |
| *G01L 1/24* | (2006.01) | |
| *A63B 71/08* | (2006.01) | |
| *G01L 1/12* | (2006.01) | |

(52) U.S. Cl.
CPC .......... *G01L 5/0052* (2013.01); *A63B 71/085* (2013.01); *G01L 1/12* (2013.01); *G01L 1/247* (2013.01); *A63B 2209/08* (2013.01); *A63B 2220/53* (2013.01)

(58) Field of Classification Search
CPC ......... G01L 1/12; G01L 1/247; G01L 5/0052; A63B 2209/08; A63B 2220/53
USPC .................. 73/11.04; 200/61.45 R, 61.45 M; 116/203, 204
See application file for complete search history.

(56) References Cited

U.S. PATENT DOCUMENTS

| | | |
|---|---|---|
| 3,459,911 A | 8/1969 | Fischer |
| 3,778,572 A | 12/1973 | Matsui et al. |
| 4,071,723 A | 1/1978 | Jackman |
| 4,097,698 A | 6/1978 | Jackman |
| 4,591,676 A | 5/1986 | Jackman et al. |
| 4,815,320 A | 3/1989 | Allen et al. |
| 5,237,135 A | 8/1993 | Wolski |
| 6,060,673 A | 5/2000 | Jackman |
| 8,234,994 B1 | 8/2012 | Branch |
| 8,387,552 B2 | 3/2013 | Branch |
| 8,646,401 B2 | 2/2014 | Branch |
| 8,863,683 B2 | 10/2014 | Branch et al. |
| 9,103,734 B2 | 8/2015 | Branch |
| 9,103,849 B2 | 8/2015 | Branch |
| 9,116,058 B2 | 8/2015 | Branch |
| 9,190,229 B2 | 11/2015 | Branch |
| 2007/0056081 A1* | 3/2007 | Aspray ................. A42B 3/067 2/411 |
| 2009/0145245 A1* | 6/2009 | Sheau-Shi et al. .... G01D 7/005 73/862.69 |

(Continued)

*Primary Examiner* — Daniel S Larkin

(74) *Attorney, Agent, or Firm* — Joseph E. Maenner; Maenner & Associates, LLC

(57) ABSTRACT

An impact sensor includes a hollow container having a plurality of walls, a first magnetic member attached to one of the plurality of walls, and a second magnetic member magnetically attracted to the first magnetic member. A marking device is disposed on the second magnetic member. When a force applied to the sensor exceeds a first predetermined value, the marking device engages one of the plurality of walls and wherein the marking device marks the one of the plurality of walls.

19 Claims, 29 Drawing Sheets

(56) References Cited

U.S. PATENT DOCUMENTS

2013/0247814 A1 9/2013 Branch
2014/0196294 A1 7/2014 Branch

* cited by examiner

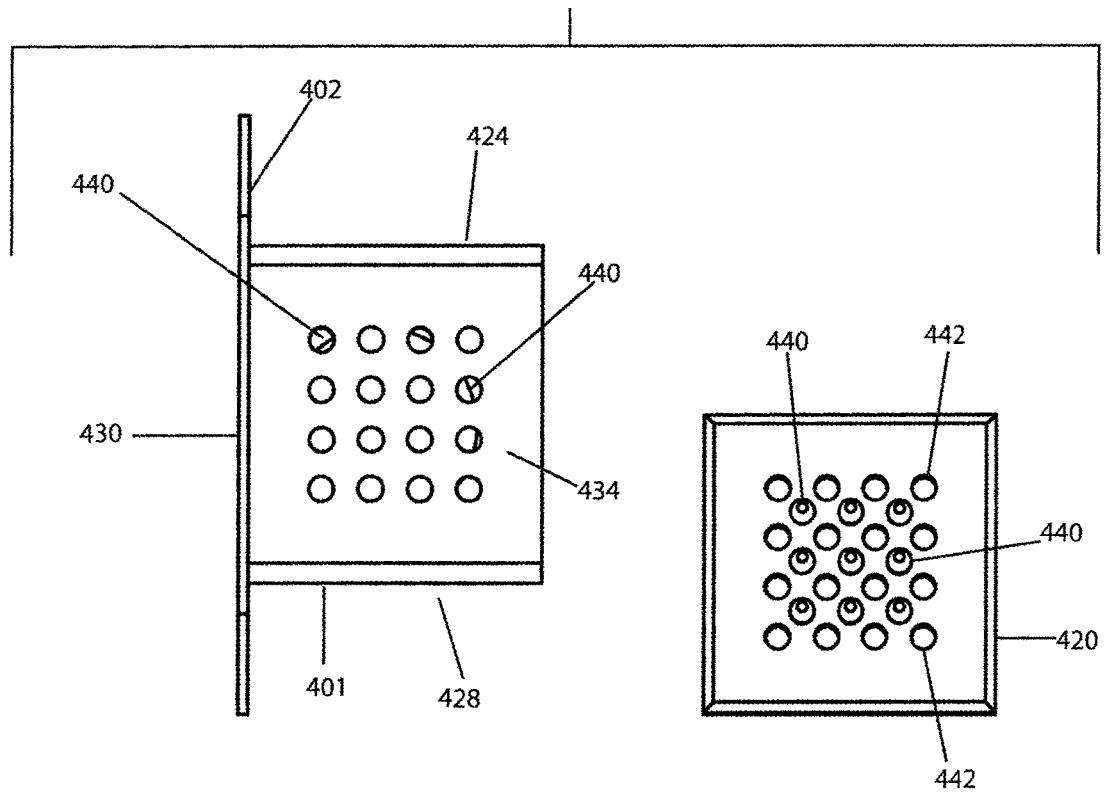
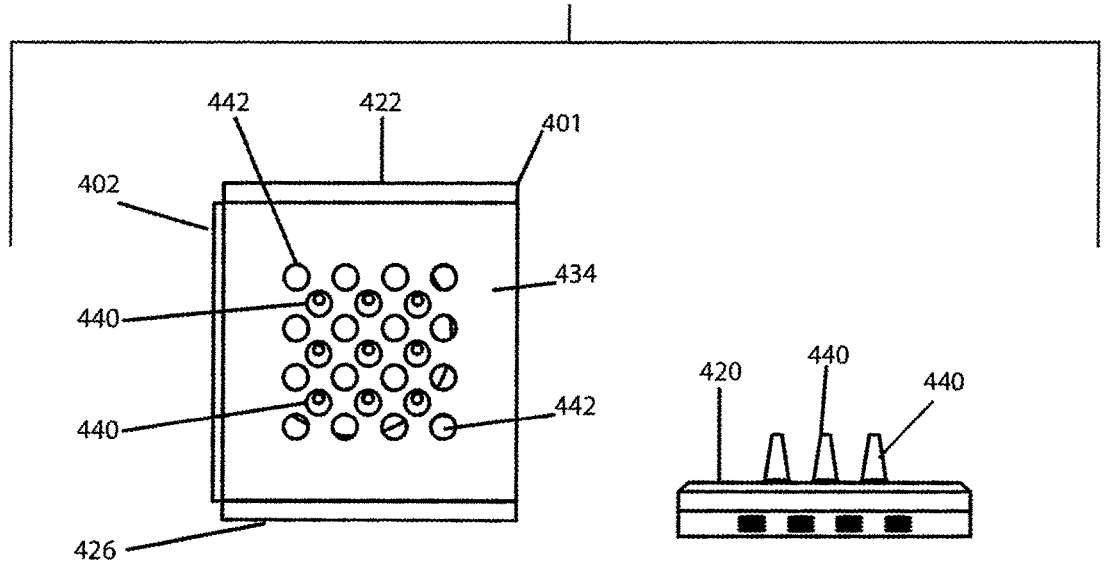

MAGNETICALLY ACTIVATED SENSOR

CROSS-REFERENCE TO RELATED APPLICATION

The subject matter of this application is related to U.S. patent application Ser. No. 14/245,150, filed Apr. 4, 2014, entitled "Mechanical Acceleration Sensor And Indicator Tube System", the teachings of which are incorporated herein by reference.

BACKGROUND OF THE INVENTION

The present invention is in the technical field of sensing devices. More particularly, the present invention is in the technical field of acceleration sensing devices. More particularly, the present invention is in the technical field of mechanical acceleration sensing devices. More particularly, the present invention is in the technical field of mechanical acceleration sensing devices with visual indicators.

BRIEF SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, the present invention is an impact sensor having a hollow container having a plurality of walls, a first magnetic member attached to one of the plurality of walls, and a second magnetic member magnetically attracted to the first magnetic member. A marking device is disposed on the second magnetic member. When a force applied to the sensor exceeds a first predetermined value, the marking device engages one of the plurality of walls and wherein the marking device marks the one of the plurality of walls.

BRIEF DESCRIPTION OF THE DRAWINGS

The accompanying drawings, which are incorporated herein and constitute part of this specification, illustrate the presently preferred embodiments of the invention, and, together with the general description given above and the detailed description given below, serve to explain the features of the invention. In the drawings:

FIG. 24 is a top plan view of the force sensor shown in FIG. 22;

FIG. 25 is a side elevational view of the force sensor shown in FIG. 22;

DETAILED DESCRIPTION

Figure 1:
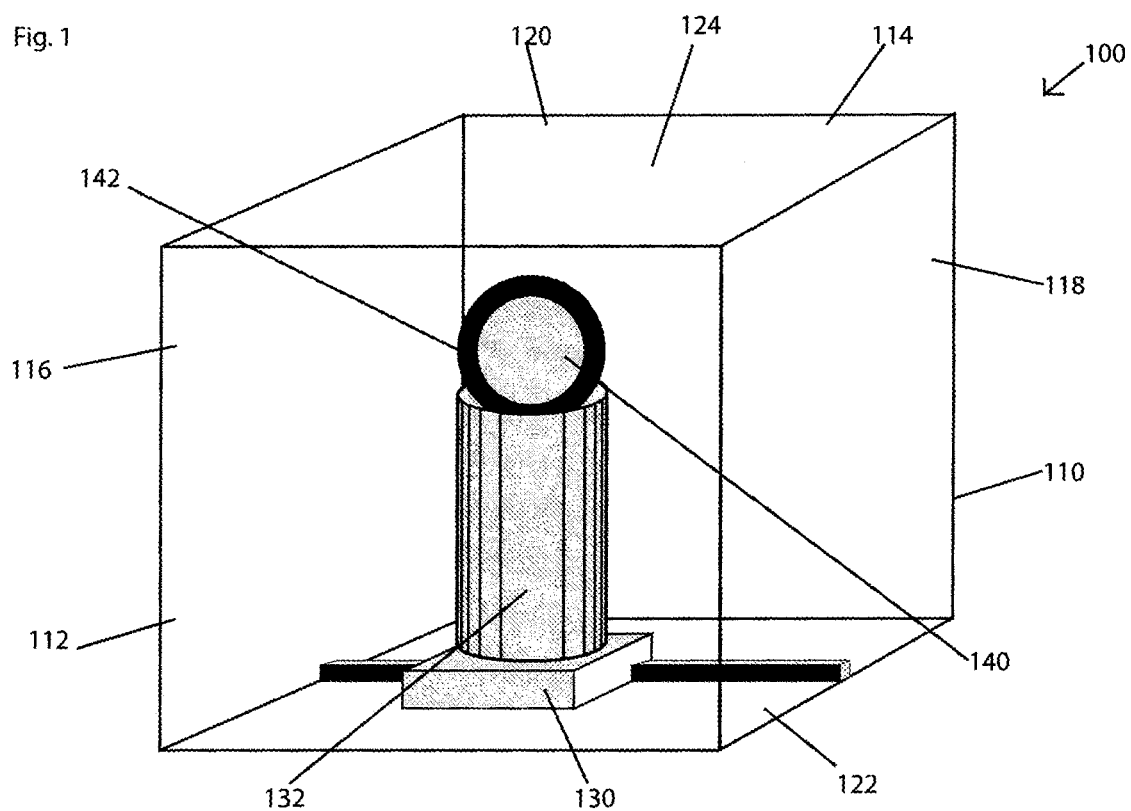
FIG. 1 is a perspective view of a force sensor according to a first exemplary embodiment of the present invention.

In the drawings, like numerals indicate like elements throughout. Certain terminology is used herein for convenience only and is not to be taken as a limitation on the present invention. The terminology includes the words specifically mentioned, derivatives thereof and words of similar import. The embodiments illustrated below are not intended to be exhaustive or to limit the invention to the precise form disclosed. These embodiments are chosen and described to best explain the principle of the invention and its application and practical use and to enable others skilled in the art to best utilize the invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Unless explicitly stated otherwise, each numerical value and range should be interpreted as being approximate as if the word "about" or "approximately" preceded the value of the value or range.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Referring to the Figures, the present invention includes a force sensor that is used to indicate when an excessive amount of force is exerted upon the sensor. In an exemplary embodiment, the inventive sensor is attached to or is integral with a mouthguard that is being worn by an athlete. Activation of the sensor provides a visual indication that the athlete suffered a blow that may be excessive and should result in the athlete being examined by a medical professional for potential head trauma.

In an alternative exemplary embodiment, the inventive sensor is attached to a package or shipping material. Activation of the sensor provides a visual indication that the package or shipping material experienced excessive jarring or jolt that could result in damage to the material being shipped.

Referring to FIGS. 1-8, a sensor 100 according to a first exemplary embodiment of the present invention is shown. Sensor 100 is generally a hollow cube 110 having six orthogonal sides: the front side 112; a rear side 114; a left side 116; a right side 118; a top side 120; and a bottom side 122. In an exemplary embodiment, cube 110 has dimensions of less than or equal to about 15 mm along each edge. In still another exemplary embodiment, cube 110 has dimensions of less than or equal to about 11 mm along each edge.

Figure 4:
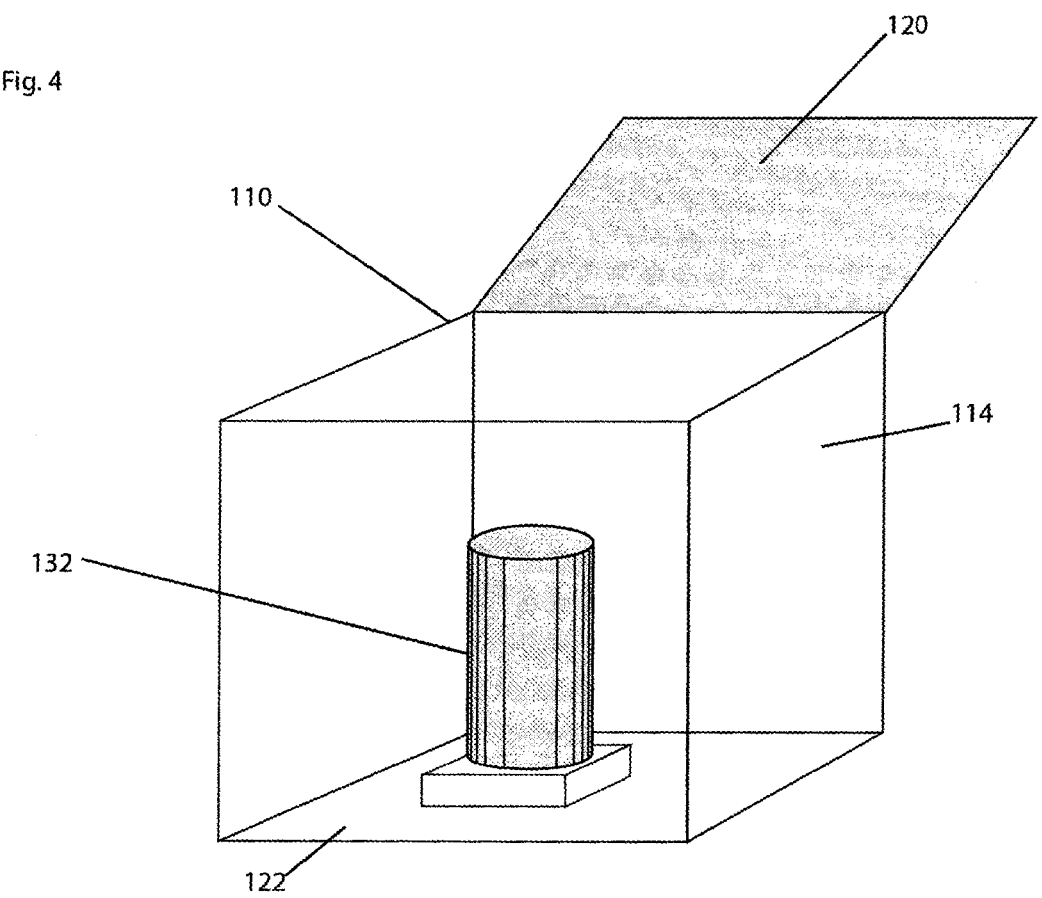
FIG. 4 is a perspective view of a housing used with the force sensor shown in FIG. 1.

As shown in FIG. 4, top side 120 can be hingedly or otherwise connected to rear side 114 so that top side 120 can be lifted, exposing the interior of cube 110. Each side 112-122 is constructed from a transparent material, such as, for example, silicone, EVA plastic, or other suitable material to allow visibility through sides 112-122 and to the interior of cube 110.

The interior of each side 112-122 is covered in a covering, such as a wicking material 124. Material 124 can be, for example, tissue paper, cotton gauze, or other suitable hydrophilic material that can retain, absorb, and distribute a liquid, such as, for example, a dye, an ink, or other suitable marking liquid radially outwardly from a contact point, as will be discussed in more detail herein. In an exemplary embodiment, wicking material 124 is generally a light color, such as white, off-white, or similar color, so that marking liquid is readily visible.

A magnet 130 is fixed to the interior of bottom side 122. A spacer 132 is mounted on top of magnet 130. Spacer 132 can be fixedly mounted to bottom side 122. Alternatively, spacer 132 can be removably mounted on bottom side 122 so that spacer 132 can be removed from sensor 100 and replaced with a different spacer 132 that activates sensor at a different force value than the first spacer 132. Spacer 132 is constructed from a nonmagnetic material, such as, for example, a plastic, such that spacer 132 is not magnetically attracted to magnet 130.

Figure 2:
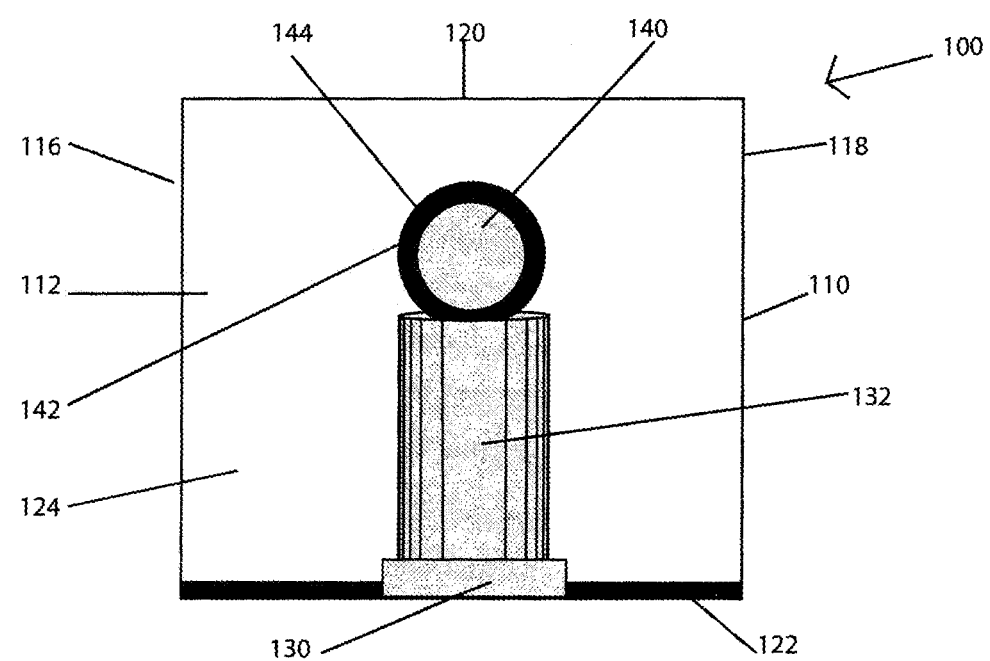
FIG. 2 is a side elevational view of the force sensor shown in FIG. 1.
Figure 3:
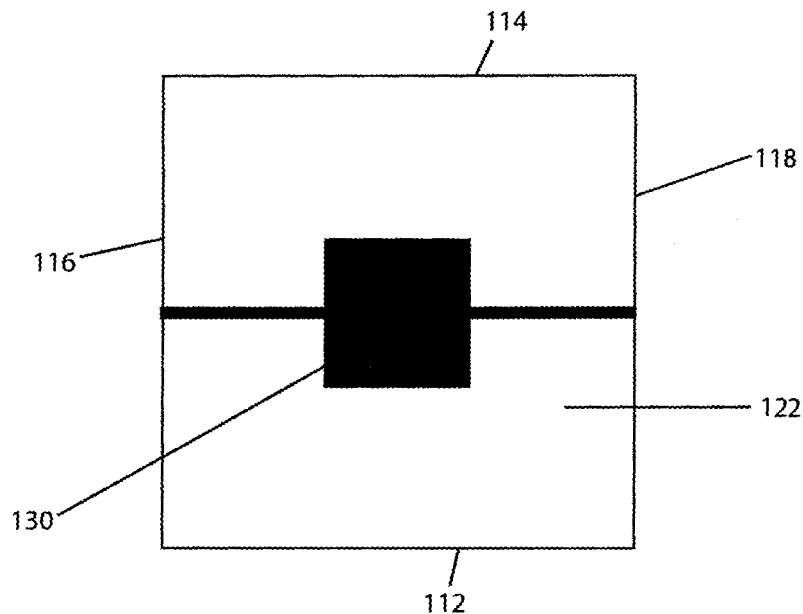
FIG. 3 is a bottom elevational view of the force sensor shown in FIG. 1.
Figure 5:
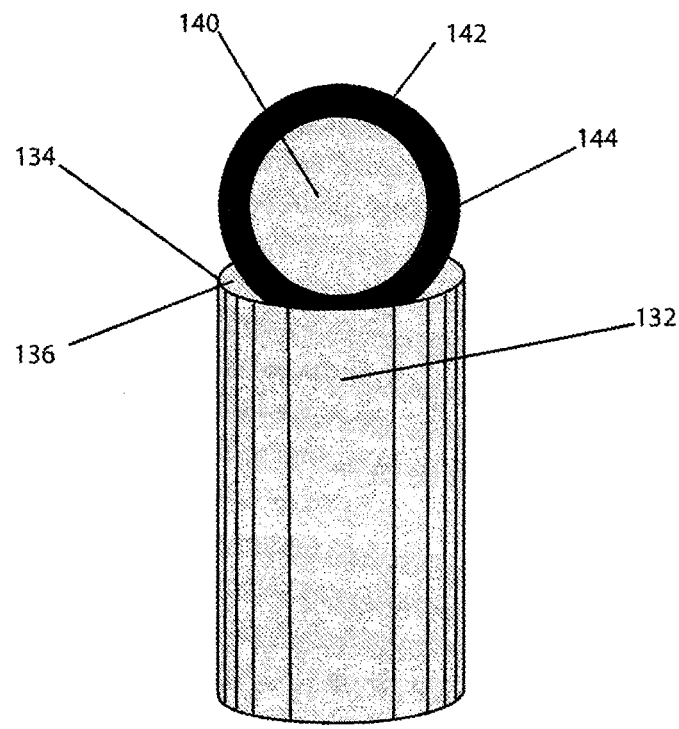
FIG. 5 is a side elevational view of a spacer and indicator sphere used with the force sensor shown in FIG. 1.

A magnetically attractive element 140, such as, for example, a sphere, is mounted on top of spacer 132. While a sphere is shown in FIGS. 1, 2, and 5, those skilled in the art will recognize that magnetically attractive element 140 can be other shapes as well. Magnetically attractive element 140 can be constructed from a material, such as, for example, carbon steel, that is magnetically attracted to magnet 130. If magnetically attractive element 140 is a sphere, a top surface 134 of spacer 132 can include a generally centrally located concave dimple 136 that seats magnetically attractive element 140 therein to overcome any natural tendency of magnetically attractive element 140 to simply roll off of spacer 132.

The magnetic field generated by magnet 130 is sufficient to retain magnetically attractive element 140 on top of spacer 132. However, when cube 110 experiences a sufficient external force applied thereto to overcome such magnetic field, magnetically attractive element 140 is displaced from the top of spacer 132.

Spacer 132 can have different heights such that magnetically attractive element 140 is spaced at different distances from magnet 130, depending upon the height of spacer 132. Generally, the higher the height of spacer 132, the farther the spacing of magnetically attractive element 140 from magnet 130, resulting in a lowering of the magnetic attraction between magnetically attractive element 140 and magnet 130 and a lower external force required to displace magnetically attractive element 140 from the top of spacer 132.

While magnet 130 is shown as being fixed to the interior of bottom side 122 and magnetically attractive element 140 is shown as being movable with respect to cube 110, those skilled in the art will recognize that magnetically attractive element 140 can be fixed to the interior of bottom side 122, and magnet 130 can be movable with respect to cube 110. Further, magnetically attractive element 140 can also be a magnet, such that a pole of magnetically attractive element 140 is located relative to an opposing pole of magnet 130 such that magnetically attractive element 140 is magnetically attracted to magnet 130.

As shown in FIG. 5, magnetically attractive element 140 is covered with an exterior coating covering 142, such as, for example, a woven or nonwoven fabric, cotton, or other suitable material, that can retain an ink or a dye 144 in a liquid state. In an exemplary embodiment, dye 144 can be a dark color, such as, for example, black or dark blue so that dye 144 is readily visible on a light-colored wicking material 124.

Figure 6:
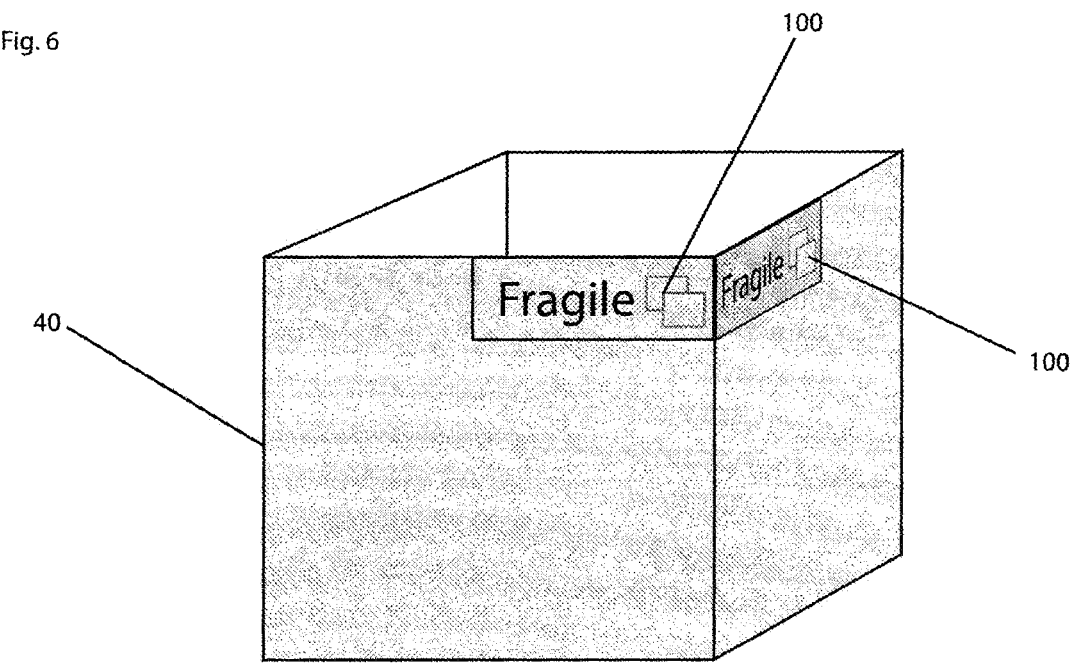
FIG. 6 is a perspective view of a shipping container with the force sensor shown in FIG. 1 being applied thereto.
Figure 7:
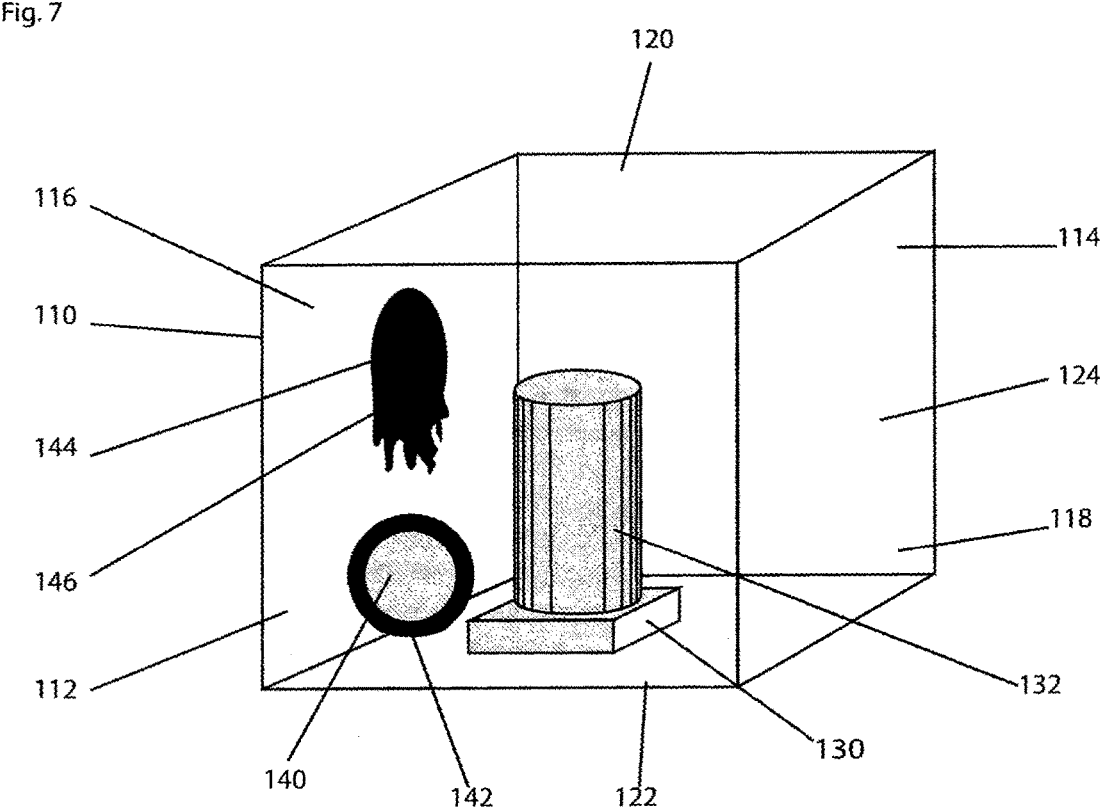
FIG. 7 is a perspective view of the force sensor shown in FIG. 1, having been activated.
Figure 8:
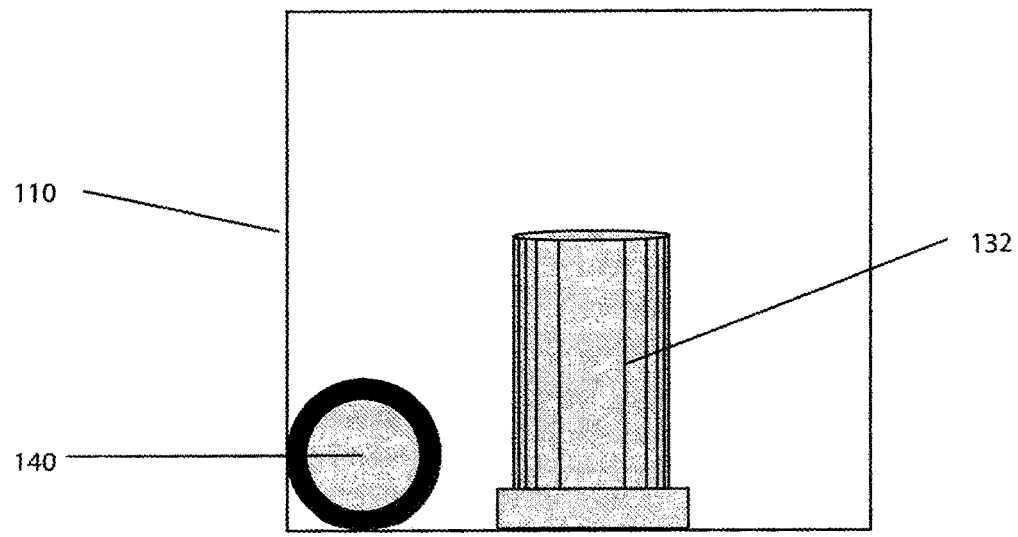
FIG. 8 is a side elevational view of the activated force sensor shown in FIG. 7.

As shown in FIG. 6, sensor 100 can be applied to a shipping container 40. More than one sensor 100 can be applied to different sides of container 40 to account for the potential for excessive force to be applied to container 40 along multiple orthogonal axes. If a force is applied to sensor 100 that is sufficient to overcome the magnetic attraction between magnet 130 and magnetically attractive element 140, then magnetically attractive element 140 is displaced from spacer 132, as shown in FIGS. 7 and 8. Depending on the magnitude and the direction of the force, upon being displaced from spacer 132, magnetically attractive element 140 engages one of sides 112-122 such that covering 142 with dye 144 engages wicking material 124, transferring at least some of dye 144 onto wicking material 124. Because of the wicking properties of wicking material 124, dye 144 radiates outwardly from the point contact 146 of covering 142 with wicking material 124, providing a visual indication that force being applied to sensor 100 exceeded a predetermined value.

Because top side 120 can be opened to the interior of cube 110, cube 110 can be attached to shipping container 40 without magnetically attractive element 140 inserted inside cube 110. Magnetically attractive element 140 can be inserted into cube 110 just before shipping to reduce the possibility of inadvertent activation of sensor 100.

Further, after sensor 100 has been used to indicate an excessive force, dyed wicking material 124 and magnetically attractive element 140 can be removed from cube 110 and replaced with a new, undyed, wicking material 124, as well as a new magnetically attractive element 140 with dye 144. Optionally, with top side 120 being open, the force value of sensor 100 can be adjusted by removing spacer 132 and replacing spacer 132 with a different spacer having a different length between magnet 130 and magnetically attractive element 140 such that a different amount of force is required to activate sensor 100.

Figure 9:
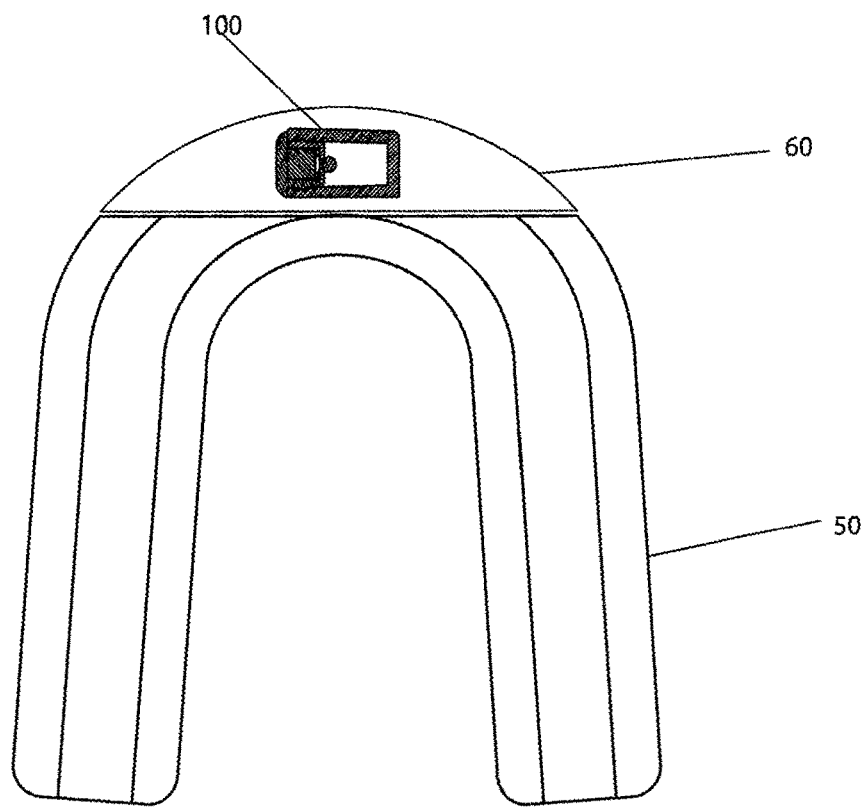
FIG. 9 is a top plan view of the sensor shown in FIG. 1 incorporated into an over mold that is attached to a mouthpiece.
Figure 10:
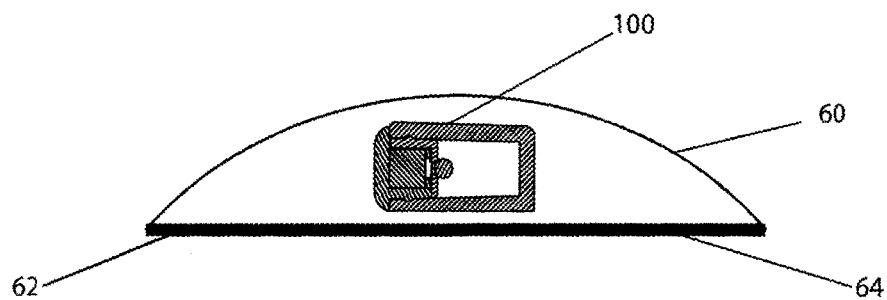
FIG. 10 is a top plan view of the sensor shown in FIG. 9 in a first exemplary embodiment of an over mold.
Figure 11:
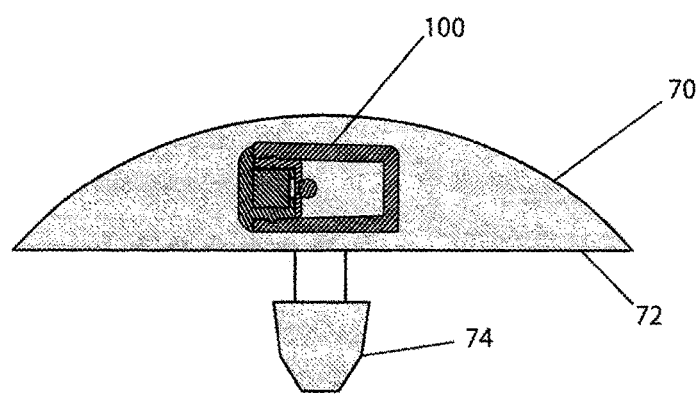
FIG. 11 is a top plan view of the sensor shown in FIG. 9 in a second exemplary embodiment of an over mold.
Figure 12:
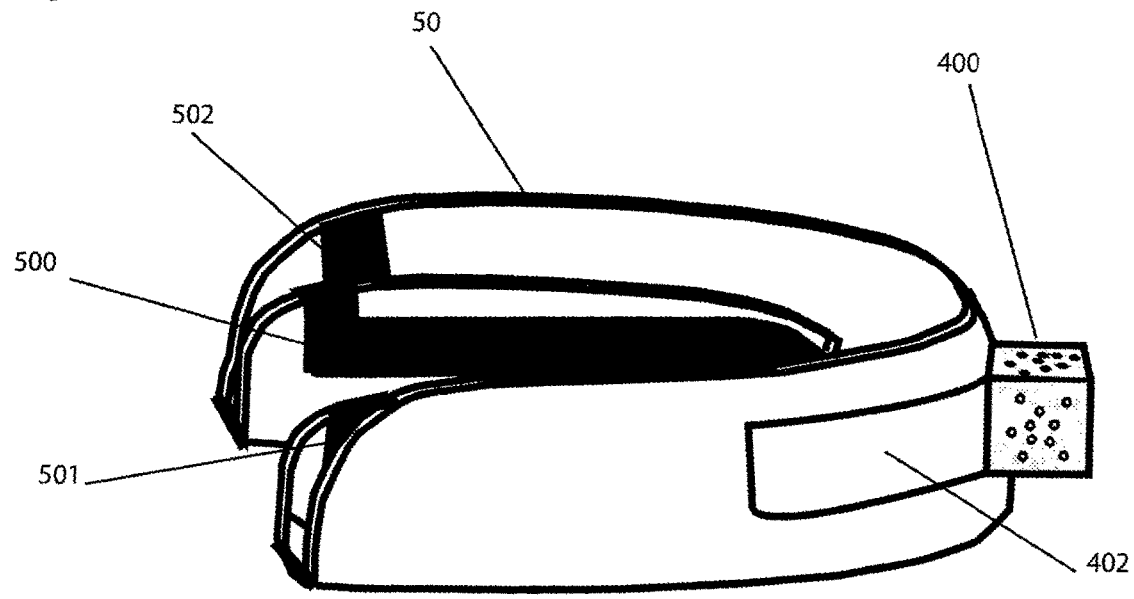
FIG. 12 is a perspective view of a force sensor according to an exemplary embodiment of the present invention, attached to a mouthguard.
Figure 13:
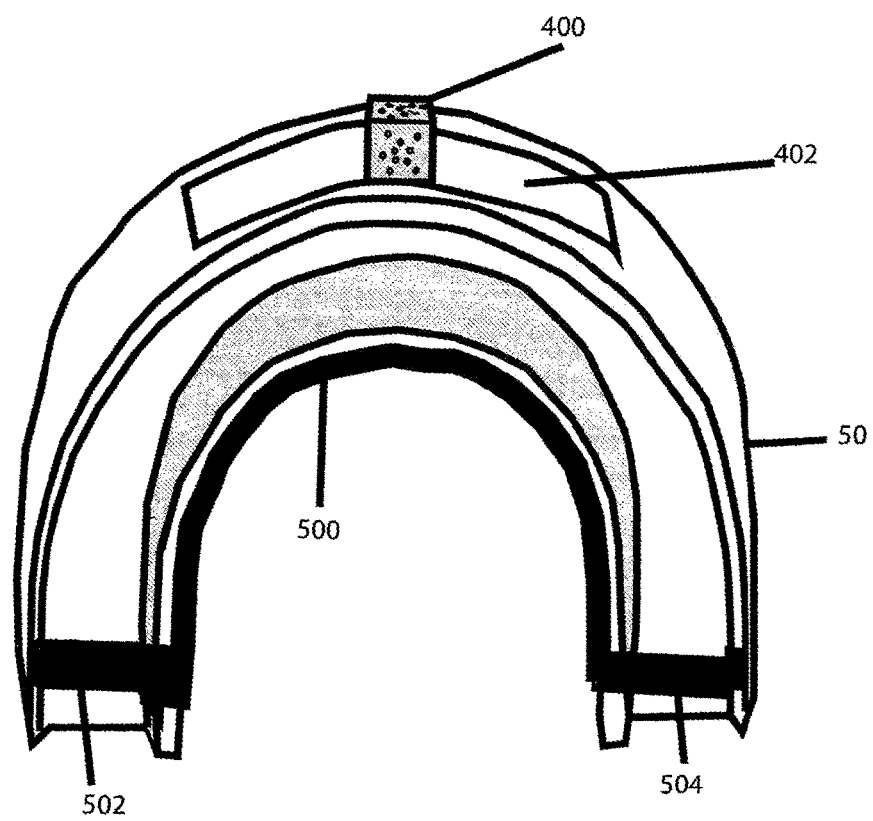
FIG. 13 is a top plan view of the force sensor with mouthguard shown in FIG. 12.
Figure 14:
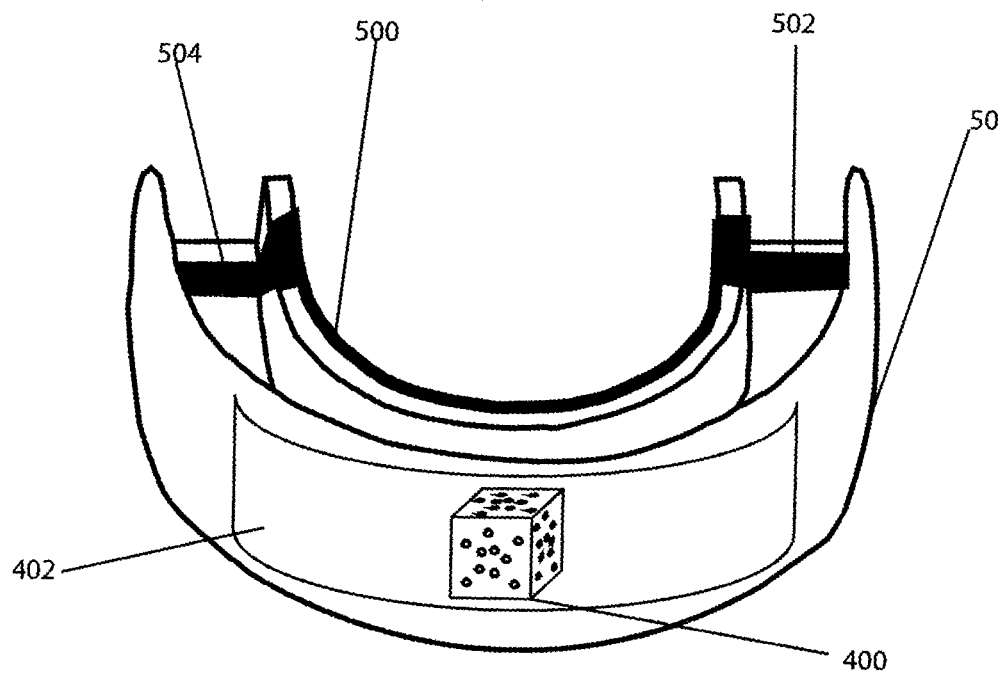
FIG. 14 is a side elevational view of the force sensor with mouthguard shown in FIG. 12.
Figure 15:
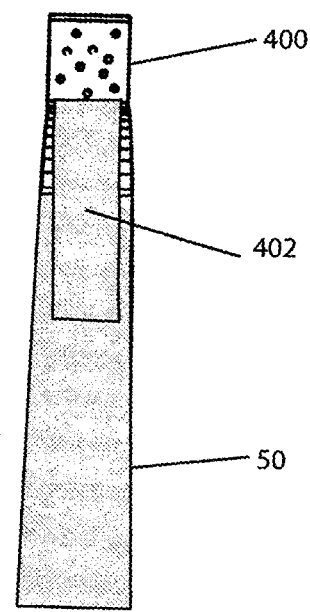
FIG. 15 is a of the force sensor with mouthguard shown in FIG. 12.

In an alternative embodiment of the present invention, as shown in FIGS. 9-11, sensor 100 can be encased in an over mold and attached to a mouthguard 50, such as, for example, for athletic use. FIGS. 9 and 10 show a first exemplary embodiment of an over mold 60 constructed from, for example, silicone, or some other suitable relatively soft durometer transparent/translucent material.

Over mold 60 is provided to protect the user's lips and teeth from abrasion by cube 110. Over mold 60 includes a generally flat surface 62 having an adhesive 64, such as, for example, glue, two-sided tape, or other suitable adhesive, applied thereto such that over mold 60 is releasably attachable to mouthguard 50 such that, after sensor 100 has been used to indicate excessive force, over mold 60 can be removed from mouthguard 50 and a replacement over mold 60, with a new sensor 100, can be attached to mouth guard 50.

FIG. 11 shows an alternative embodiment of an over mold 70, in which sensor 100 is encased. Over mold 70 includes a generally flat surface 72 having a prong 74 extending outwardly therefrom. Prong 74 can be inserted into a corresponding slot (not shown) in mouthguard 50 such that, absent sufficiently strong axial force, prong 74 retains over mold 70 attached to mouthguard 50. Similar to over mold 60, after sensor 100 has indicated an excessive force, over mold 70 can be removed from mouthguard 50 and replaced with a new sensor 100 and embedded in a new over mold 70.

Referring specifically to FIGS. 12-15, an alternative embodiment of a sensor 400 is mounted on a mouthguard 50. In an exemplary embodiment, sensor 400 can be generally cubic in shape, although those skilled in the art will recognize the sensor 100 can be other shapes as well. Sensor 400 can be removably adhered to mouthguard 50 via an adhesive strip 402.

Figure 16:
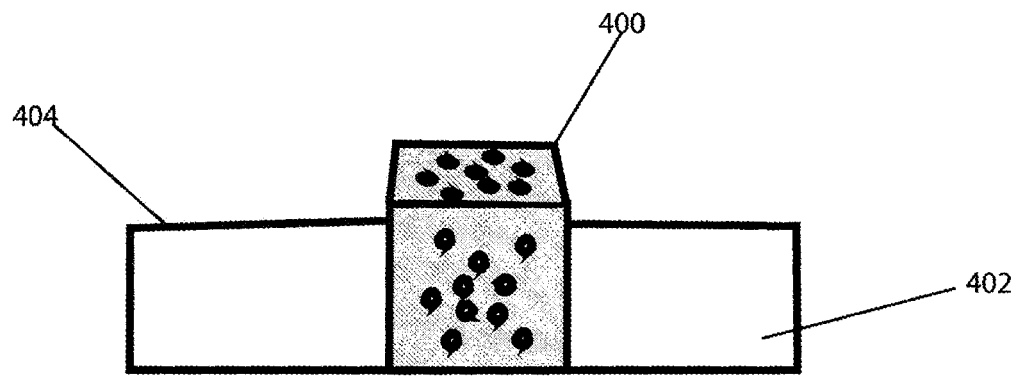
FIG. 16 is a perspective view of the force sensor shown in FIG. 12.
Figure 17:
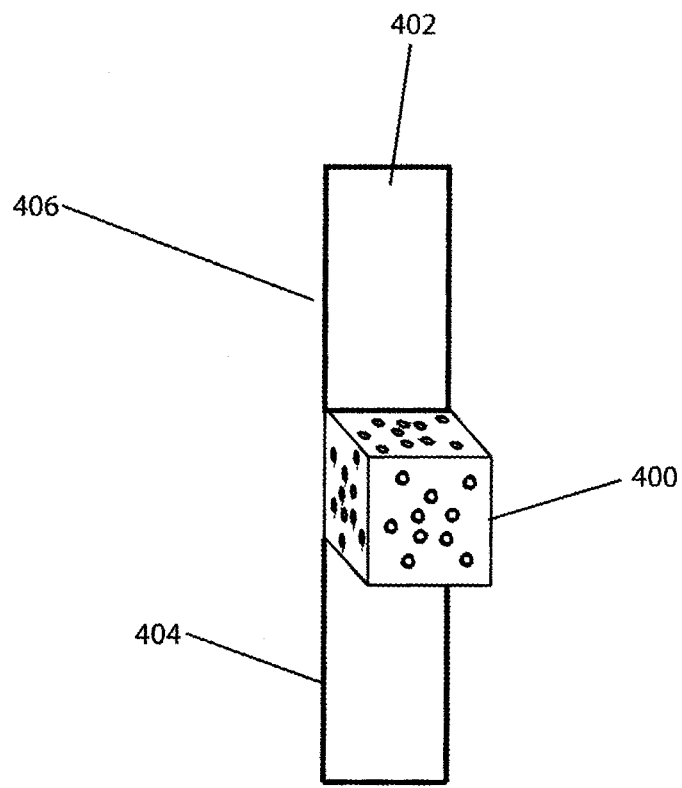
FIG. 17 is a side elevational view of the force sensor shown in FIG. 16.
Figure 18:
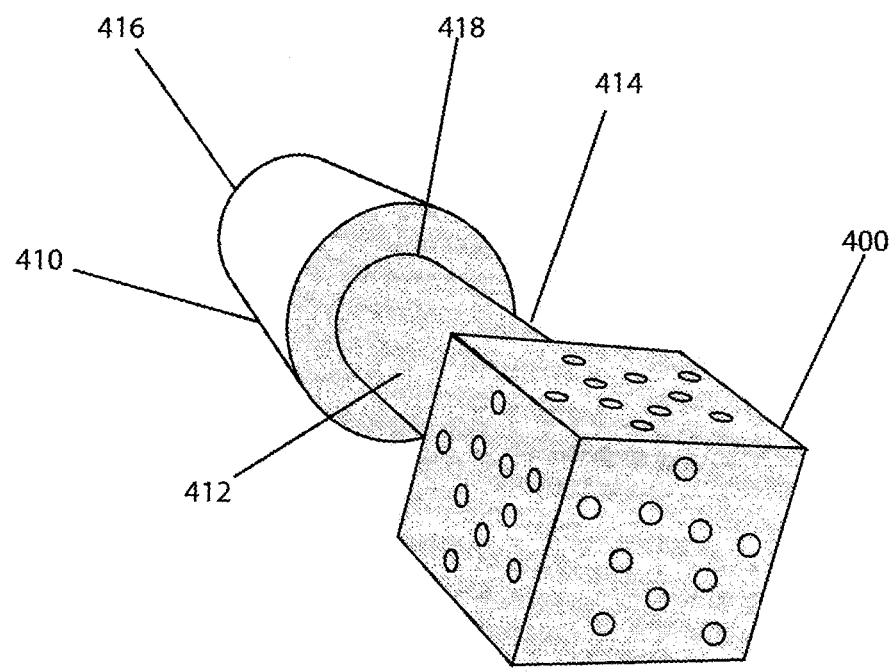
FIG. 18 is a perspective view of an alternative embodiment, the force sensor shown in FIG. 12.
Figure 19:
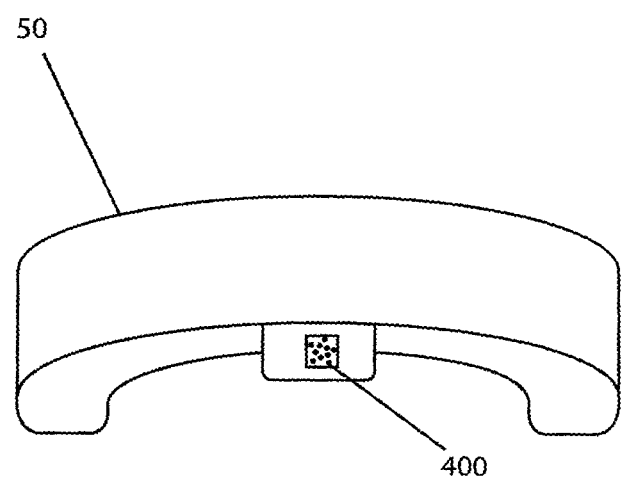
FIG. 19 is a front elevational view of the force sensor shown in FIG. 18 attached to the mouthguard shown in FIG. 12.
Figure 20:
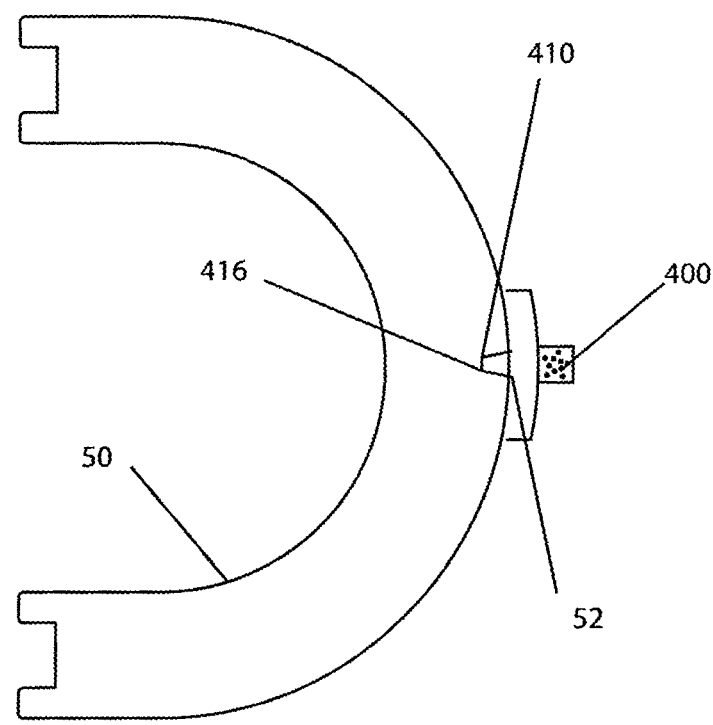
FIG. 20 is a bottom plan view of the force sensor and mouthguard shown in FIG. 19.
Figure 21:
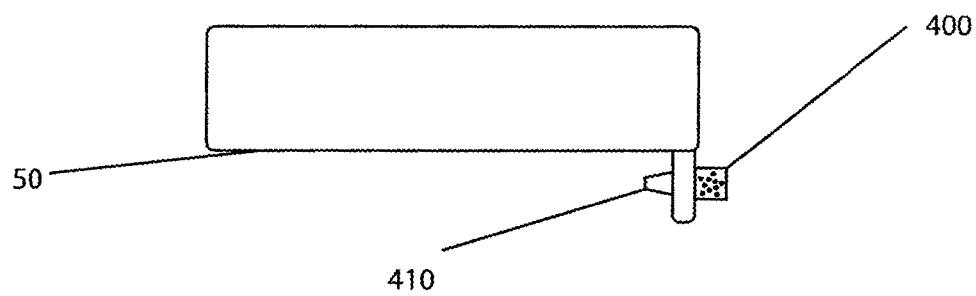
FIG. 21 is a side elevational view of the force sensor and mouthguard shown in FIG. 19.
Figure 22:
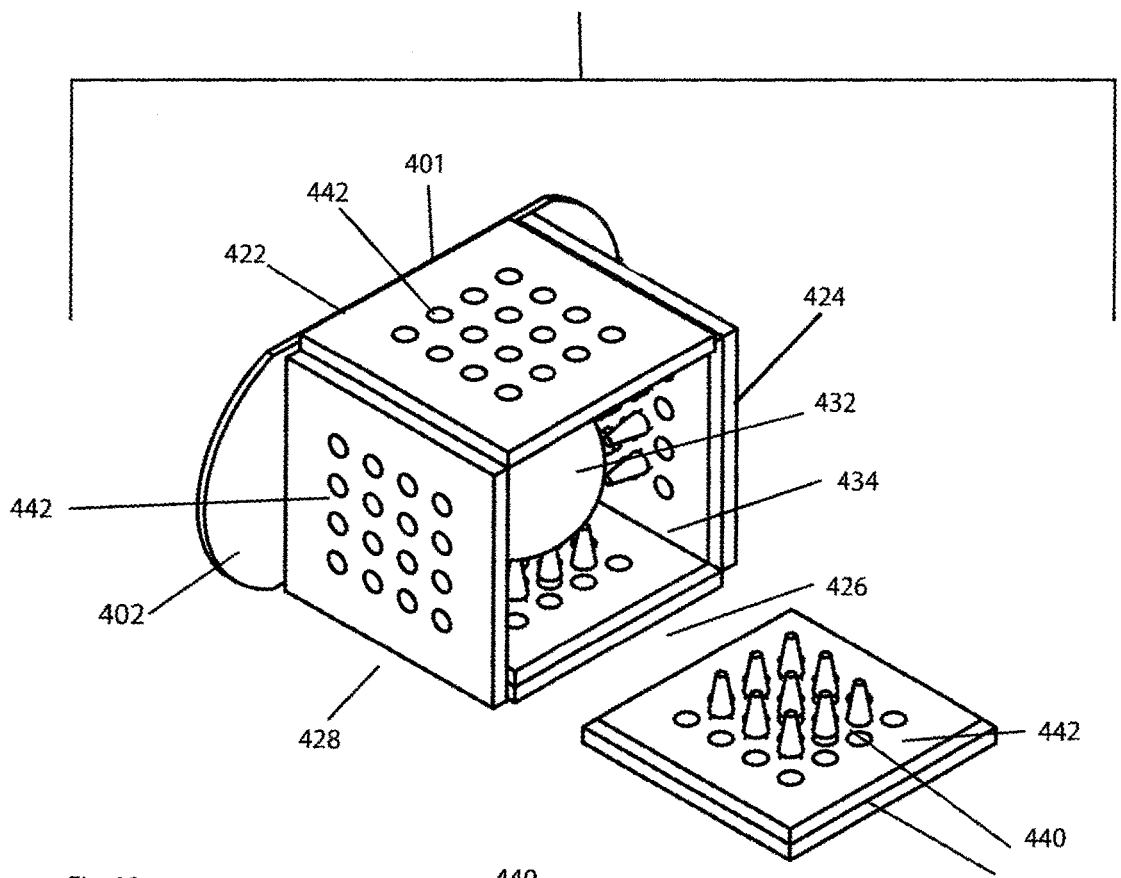
FIG. 22 is an exploded perspective view of the force sensor shown in FIG. 19.
Figure 23:
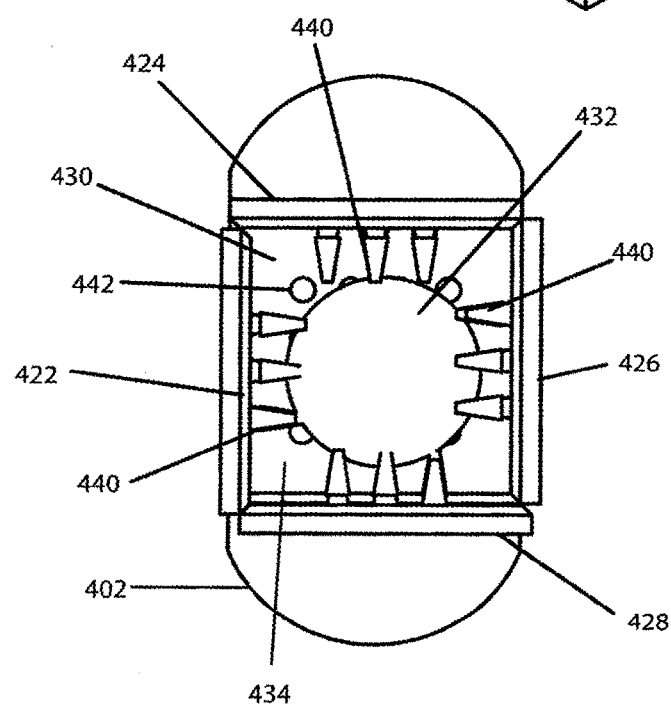
FIG. 23 is a top plan view of the sensor shown in FIG. 22 with a front face removed.
Figure 26:
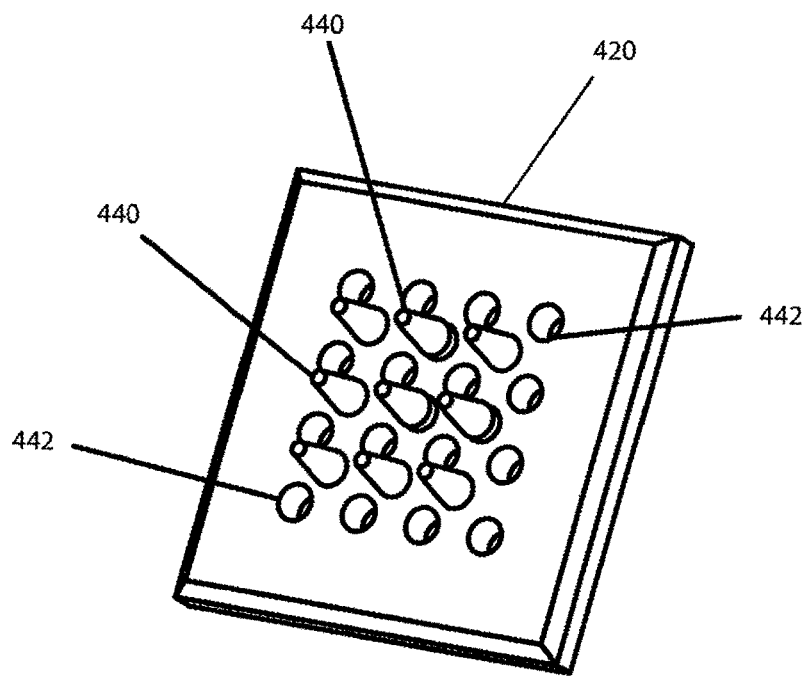
FIG. 26 is an enlarged view of the front face of the sensor shown in FIG. 22.

FIGS. 16 and 17 show sensor 400 with adhesive strip 402. Adhesive strip 402 can be an elongate strip having sensor 400 mounted on a first side 404 of strip 402, with adhesive on a reverse side 406 of strip 402.

Instead of strip 402, as shown in FIGS. 18-21, a prong 410 can extend outwardly from one side of sensor 400. Prong 410 includes a generally cylindrical extension 412 coupled to sensor 400 at a first end 414 thereof and a barb 416 extending from a second end 418 thereof. Barb 416 fits into an opening 52 in mouthguard 50, such that barb 416 has a larger diameter than that of opening 52. Mouthguard 50 is constructed from a pliable material, such as, for example, ABS plastic or other suitable material, that allows barb 416 to be wedged into opening 52, yet still enables barb 416 to be removed from opening 52 with the application of force in order to remove sensor 400 from mouthpiece 50. Alternatively, instead of adhesive strip 402 or extension 412, sensor 400 can be integrally formed with mouthguard 50.

Referring now to FIGS. 22-26, sensor 400 can have a generally six-faced cubic structure 401 with an exterior wall 420, four sidewalls 422, 424, 426, 428, and a rear wall 430 that engages first side 404 of adhesive strip 402. In an exemplary embodiment, each of exterior wall 420, four sidewalls 422, 424, 426, 428, and rear wall 430 can have dimensions of approximately 1 cm on each side, for area of 1 cm$^2$. Further, structure 401 can be constructed from an EVA Thermo molded plastic, or other suitable rigid or semi-rigid material.

Each of exterior wall 420, four sidewalls 422, 424, 426, 428, and rear wall 430 contains at least one, and, preferably, a plurality of projections 440 extending inwardly toward a chamber 434 formed by exterior wall 420, four sidewalls 422, 424, 426, 428, and rear wall 430. In an exemplary embodiment, as shown FIG. 26, projection 440 has a generally frustoconical shape, although those skilled in the art will recognize that projection 440 can have other shapes, such as, for example, conical, pyramidal, cylindrical, or other suitable shapes. In an exemplary embodiment, each projection 440 has a height of about 0.2 cm as well as a maximum width of about 0.2 cm.

Additionally, at least one and, preferably, a plurality of through openings 442 are formed in each of exterior wall 420 and four sidewalls 422, 424, 426, 428, spaced around projections 440. In an exemplary embodiment, each of through openings 442 has a diameter of about 0.05 cm.

A dye pellet 432 is disposed within chamber 434. Projections 440 engage dye pellet 432 and generally center dye pellet 432 within chamber 434. Dye pellet 432 can be constructed from a gelatin-based covering that encapsulates a dye or other liquid therein. When sensor 400 encounters excessive force applied thereto, such as, for example, when the user of mouthpiece 50 on which sensor 400 is mounted receives a blow to his/her head or some other blow to his/her person that results in potential injury to the head, dye pellet 432 is forced against at least one of the projections 440, with sufficient force in at least one of projections 440 penetrates and ruptures the covering of dye pellet 432, releasing the dye stored within dye pellet 432. The dye pours from sensor 400 through through-openings 442, providing a visual indication at sensor 400, mouthguard 50, and in the user's mouth that sensor 400 has experienced an excessive force. It is desired that the dye color is different from that of structure 401 so that the dye color can readily be seen. For example, structure 401 can be white, while the dye can be blue.

In an exemplary embodiment, dye pellet 432 ruptures at a force equivalent to or greater than about 70 times the gravitational force (g's). In an alternative exemplary embodiment, dye pellet 432 ruptures at a force equivalent to or greater than about 50 g's. In still another alternative exemplary embodiment, dye pellet 432 ruptures any force equivalent to or greater than about 40 g's. In yet another alternative exemplary embodiment, dye pellet 432 ruptures any force equivalent to or greater than about 30 g's. The thickness of the covering determines the amount of force required for projections 442 puncture the covering. For example, the thicker the covering, the greater the force required to puncture the covering.

Optionally, first side 404 of adhesive strip 402 can include a reactive agent that reacts with the dye in order to also change color of adhesive strip 402. For example, similar to litmus paper, the dye can be at least slightly acidic, such as, for example, similar to a citric acid, such that, upon contact with first side 404 of adhesive strip 402, adhesive strip 402 turns color, such as, for example, red.

While exterior wall 420, four sidewalls 422, 424, 426, 428, and rear wall 430 are shown as having straight sides, forming distinct edges and corners, those skilled in the art will recognize that all edges and corners can be rounded in order to reduce potential discomfort to the wearer. Further, although sensor 400 is shown having a generally cubic exterior shape, those skilled in the art will recognize that sensor 400 can have other shapes, such as, for example, circular or rectangular. Additionally, while dye pellet 432 is shown in the Figures as being generally circular in shape, those skilled in the art will also recognize dye pellet 432 can be other shapes. For example, if sensor 400 has a generally rectangular shape, dye pellet 432 can be generally oblong in shape.

Figure 27:
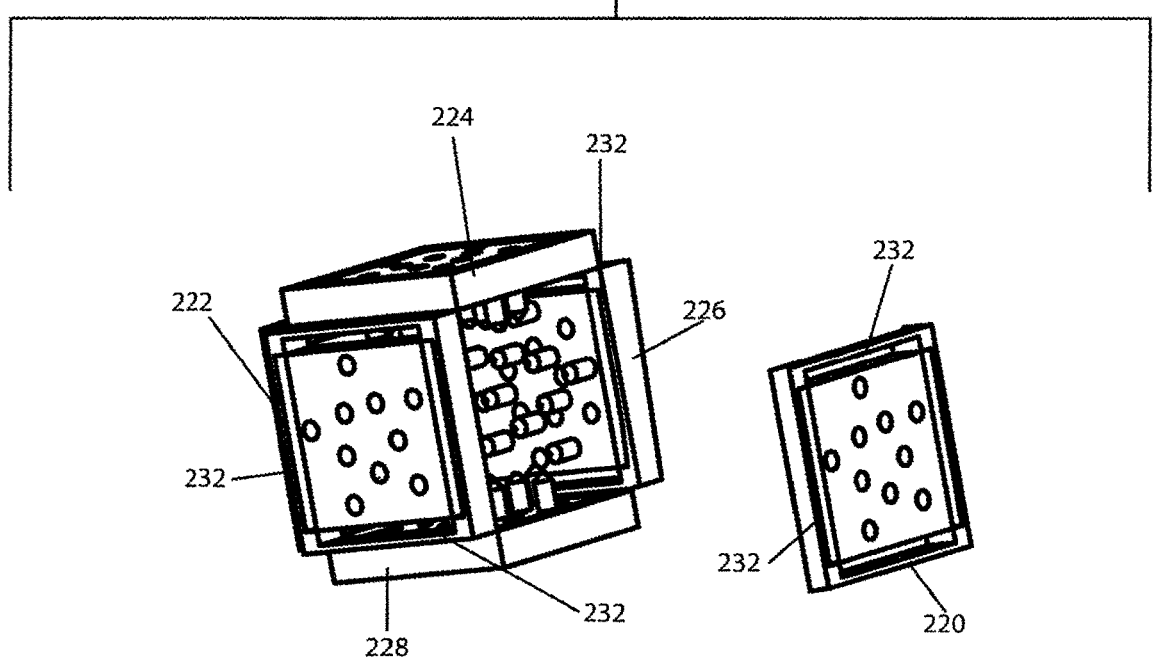
FIG. 27 is an exploded perspective view of a force sensor according to an alternative exemplary embodiment of the present invention.
Figure 28:
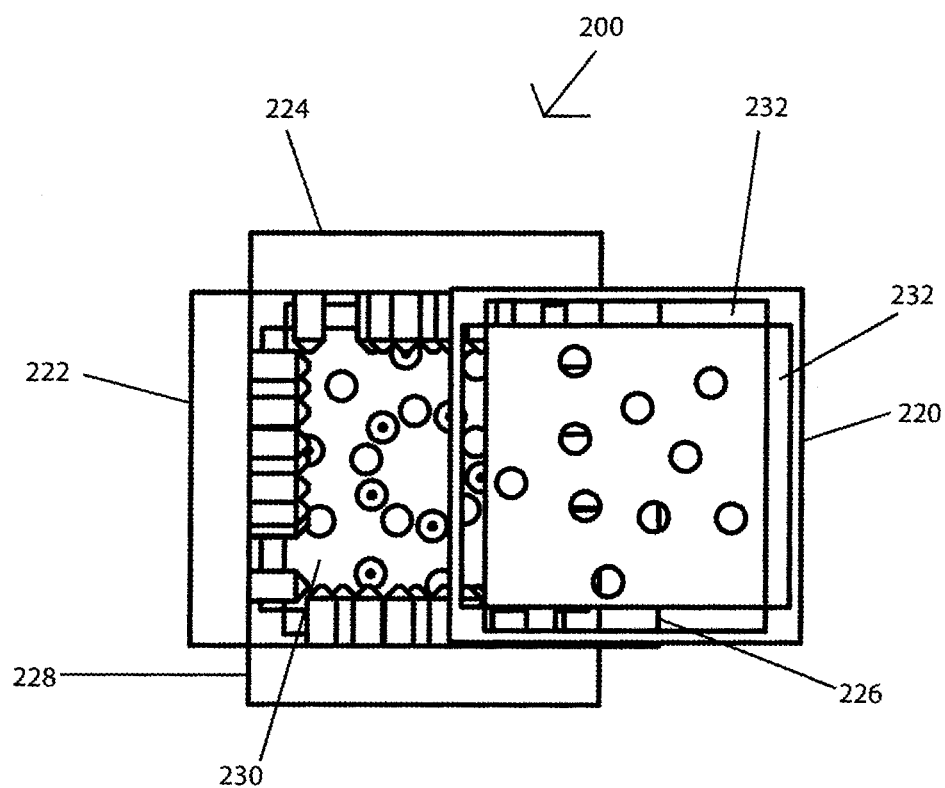
FIG. 28 is a top plan view of the force sensor shown in FIG. 27, with its exterior wall, partially attached thereto.
Figure 29:
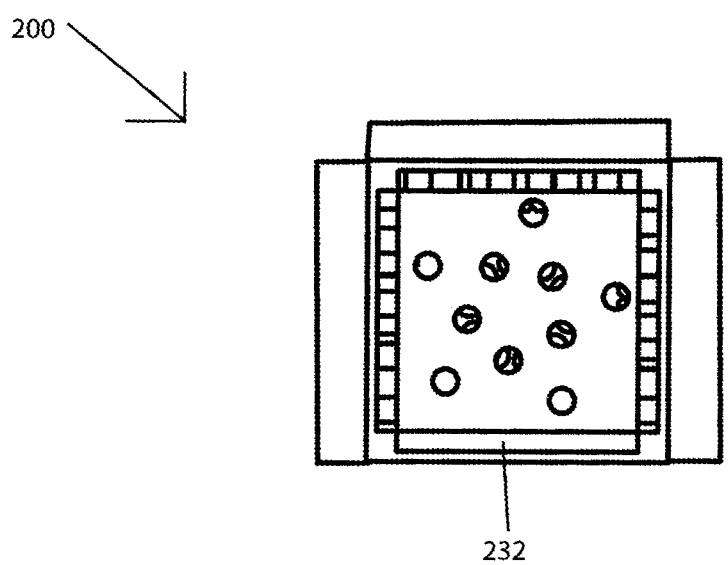
FIG. 29 is a side elevational view of the force sensor shown in FIG. 28.

An alternative embodiment of a sensor 200 according to the present invention is shown in FIGS. 27-29. A sensor 200 is similar to sensor 400 and the exception that exterior wall 220 is removably attached to sidewalls 222, 224, 226, 228 such that, after dye pellet 432 (not shown) that is installed inside sensor 200 ruptures, exterior wall 220 can be removed so that the remainder of dye pellet 432 can also be removed from sensor 200 and a replacement dye pellet 432 can be installed. Exterior wall 220 can then be reattached to sidewalls 222, 224, 226, 228 so that sensor 200 can be reused. Additionally, exterior wall 220, along with sidewalls 222, 224, 226, 228, and rear wall 230 can also include generally rectangular openings 232 around the periphery of each wall. Rectangular openings 232 provide a large open area for the dye to pour out of sensor 200 after dye pellet 432 is ruptured.

Figure 30:
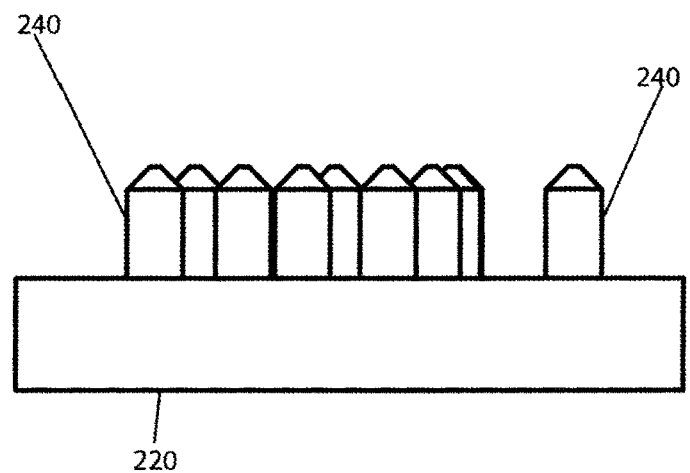
FIG. 30 is a side elevational view of the exterior wall shown in FIG. 27.
Figure 31:
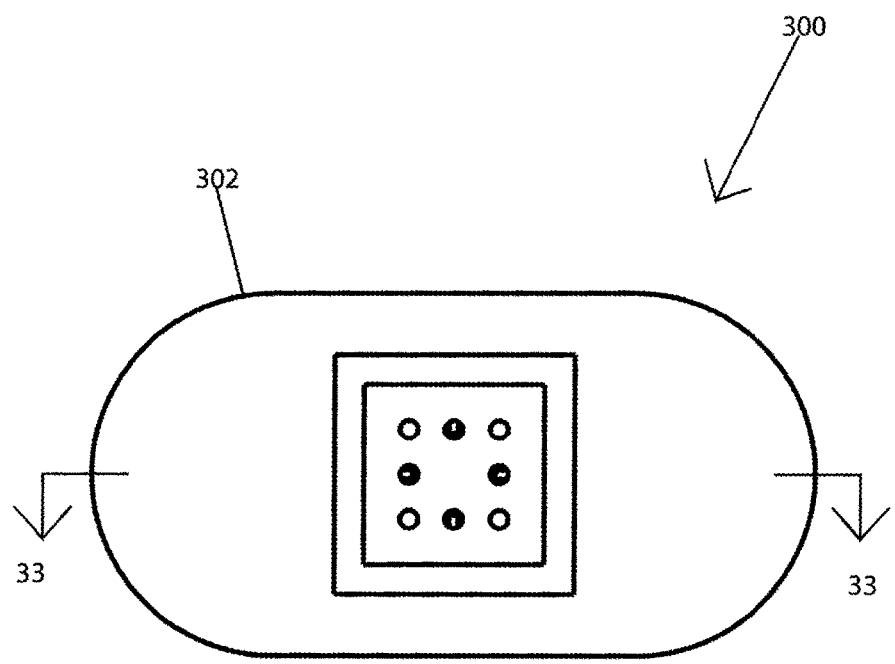
FIG. 31 is a top plan view of a force sensor according to an alternative exemplary embodiment of the present invention.
Figure 32:
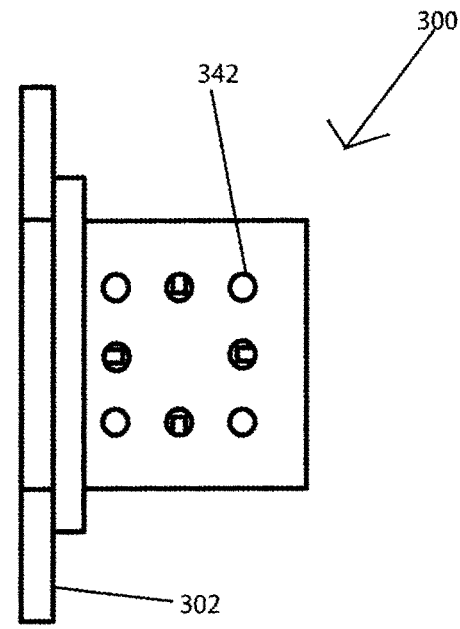
FIG. 32 is a side elevational view of the force sensor shown in FIG. 31.
Figure 33:
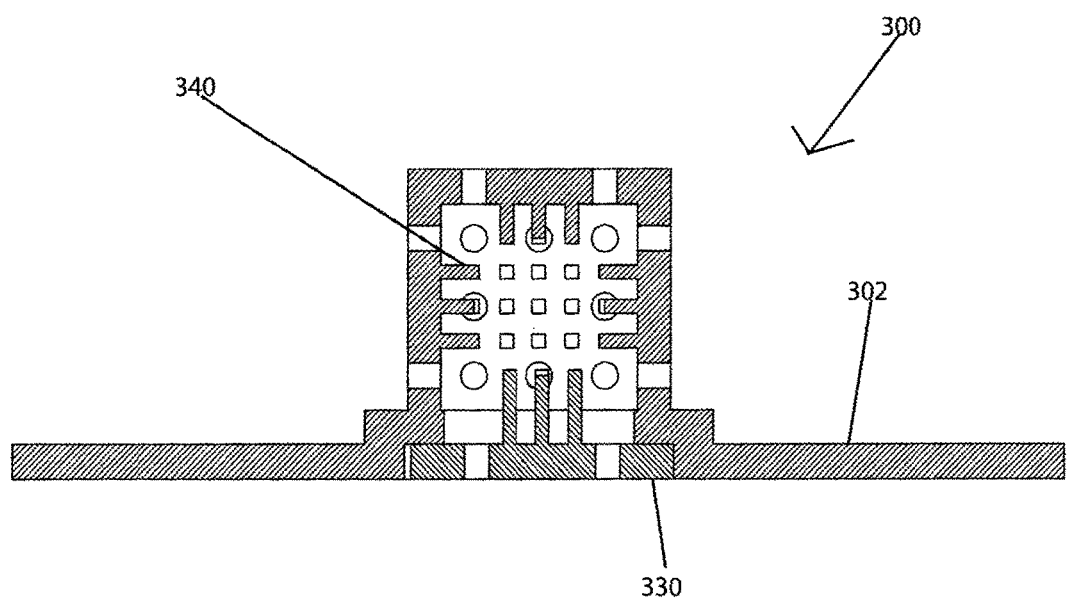
FIG. 33 is a sectional view of the force sensor shown in FIG. 31, taken along lines 33-33 of FIG. 31.
Figure 34:
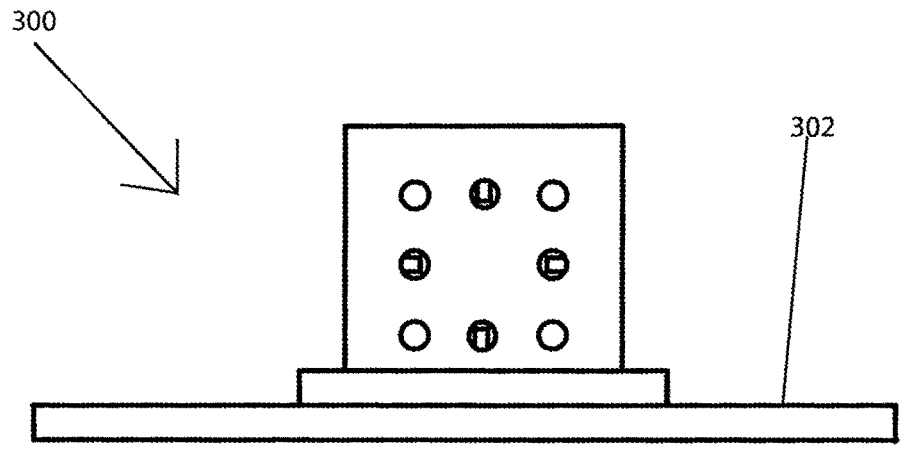
FIG. 34 is a top plan view of the force sensor shown in FIG. 31.
Figure 35:
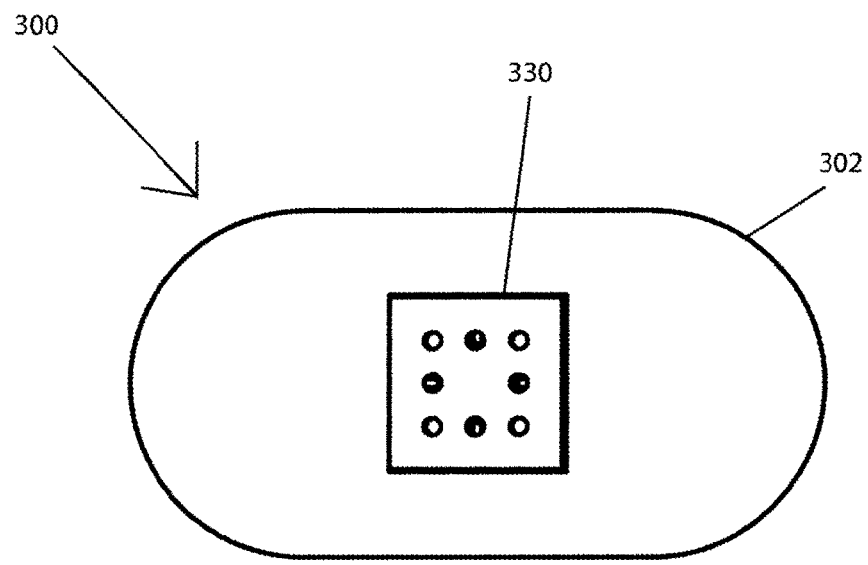
FIG. 35 is a rear elevational view of the force sensor shown in FIG. 31.
Figure 36:
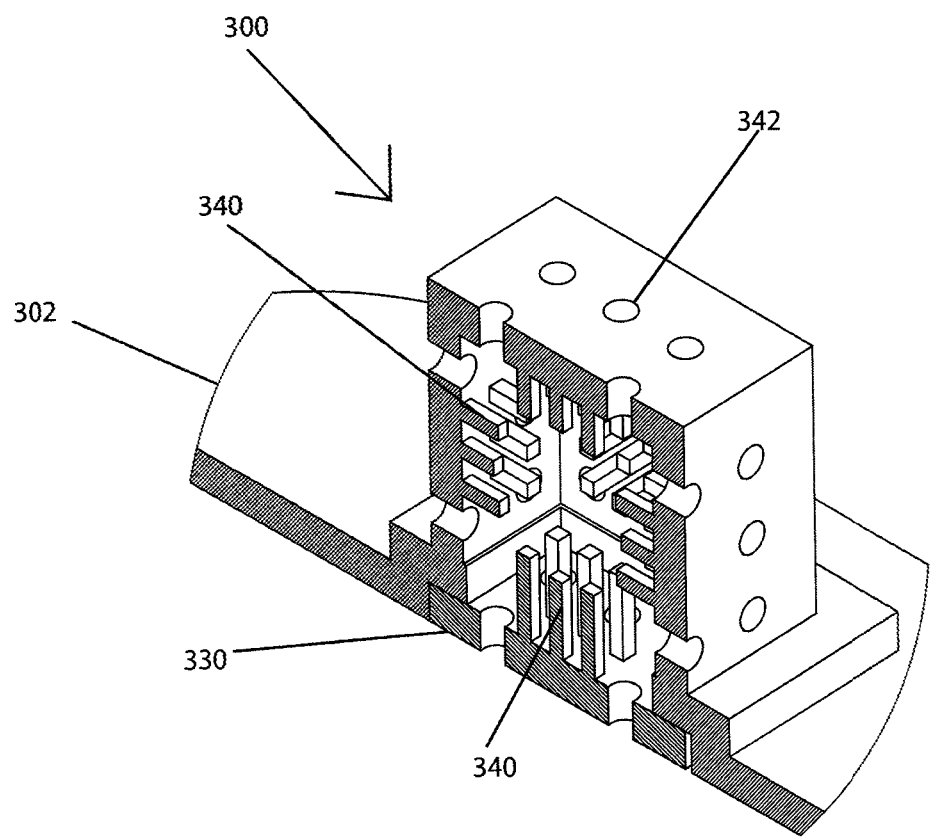
FIG. 36 is a perspective view, in section, of the force sensor shown in FIG. 31.
Figure 37:
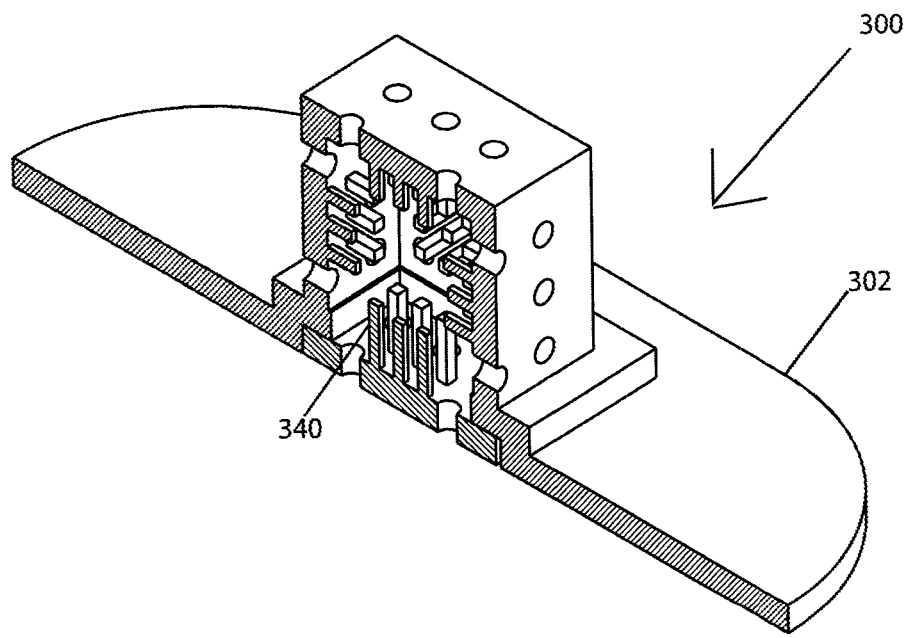
FIG. 37 is a perspective view, in section, of the force sensor shown in FIG. 31.
Figure 38:
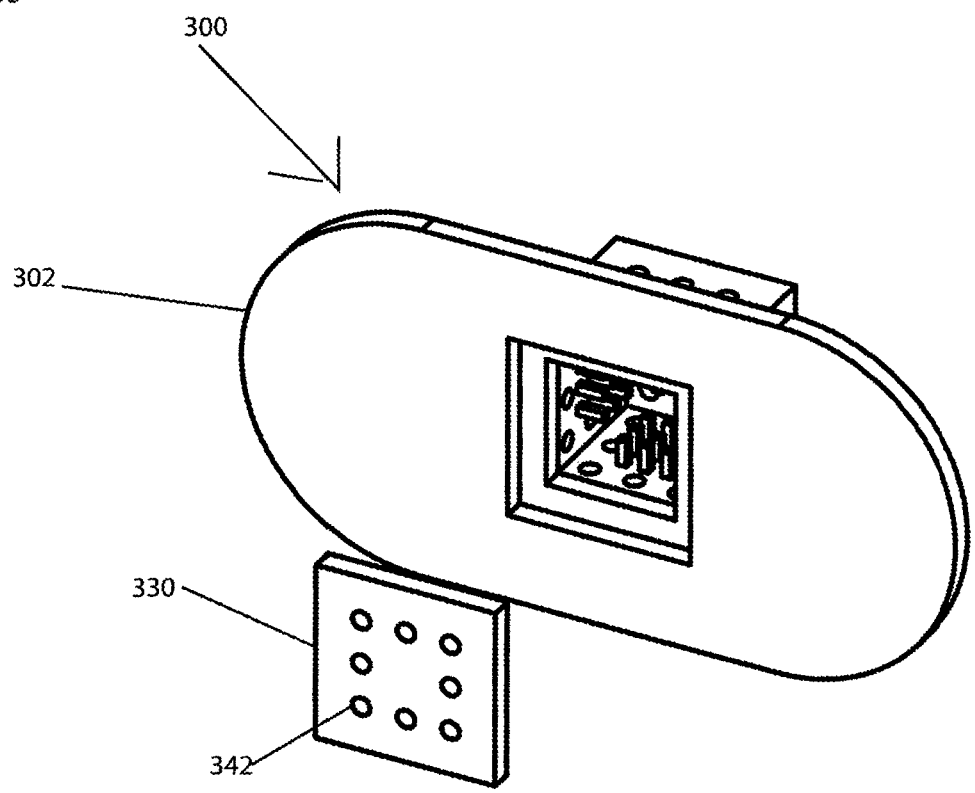
FIG. 38 is an exploded perspective view of the force sensor shown in FIG. 31.
Figure 39:
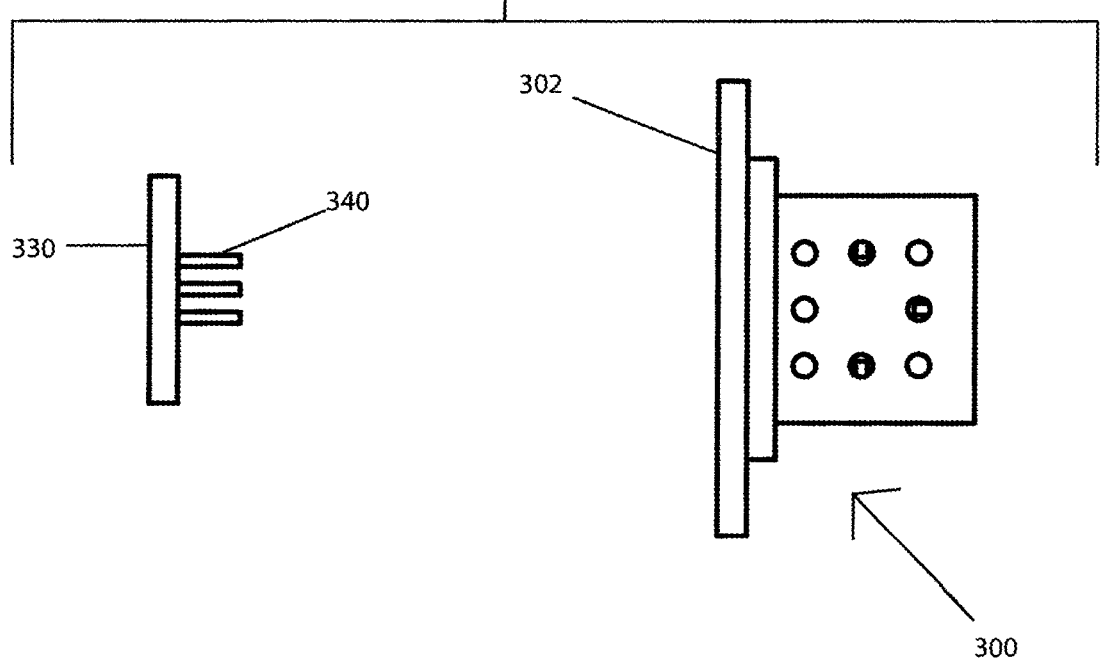
FIG. 39 is a side elevational view of the force sensor shown in FIG. 38.
Figure 40:
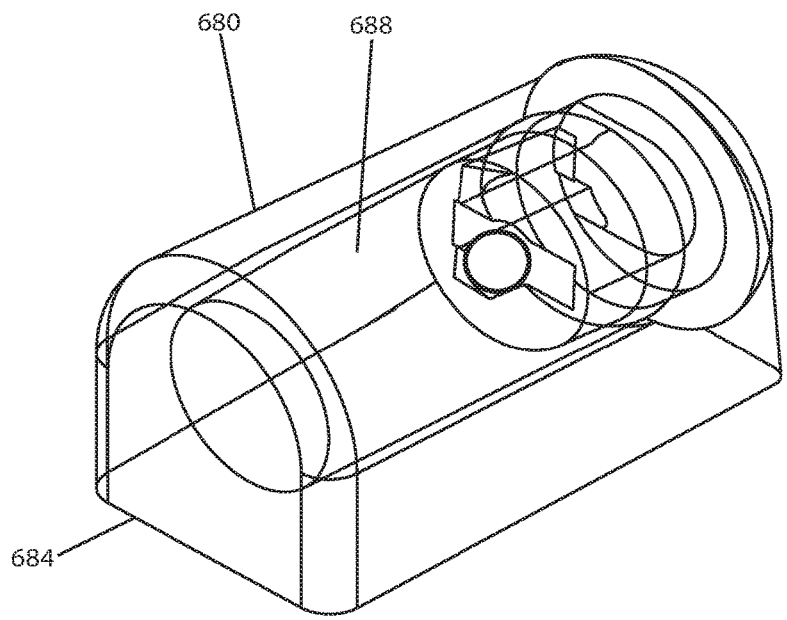
FIG. 40A is a perspective view of a force sensor according to another exemplary embodiment of the present invention.
FIG. 40B is a side elevational view of the sensor shown in FIG. 40A.
FIG. 40C is a bottom plan view of the sensor shown in FIG. 40A.
FIG. 40D is a top plan view of the sensor shown in FIG. 40A.
Figure 40:
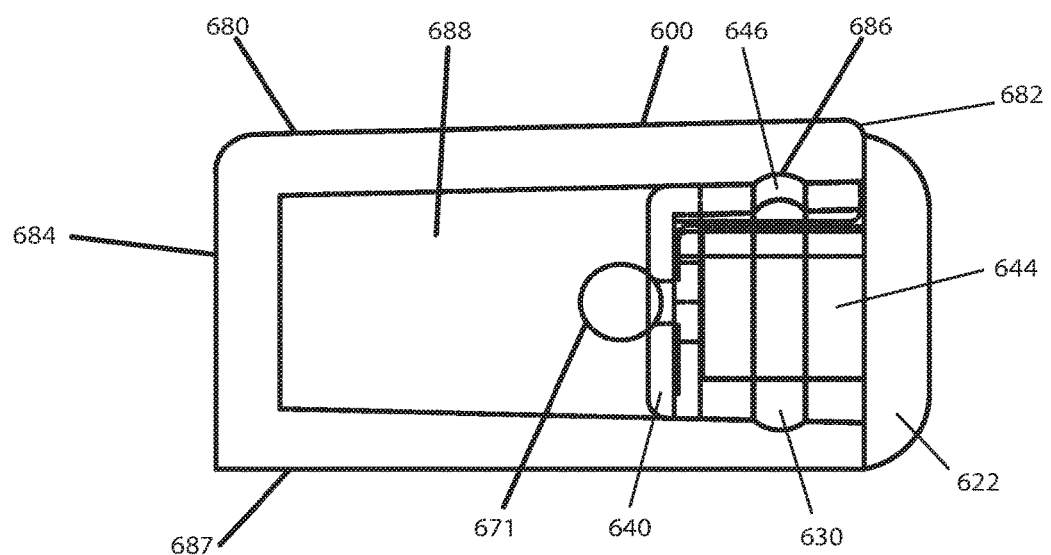
Figure 40:
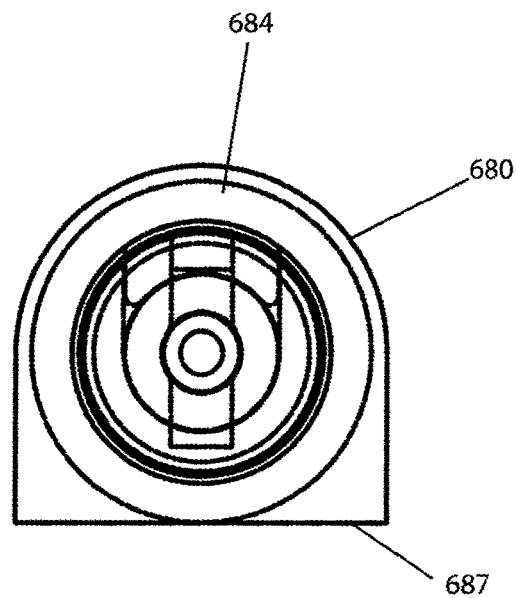
Figure 40:
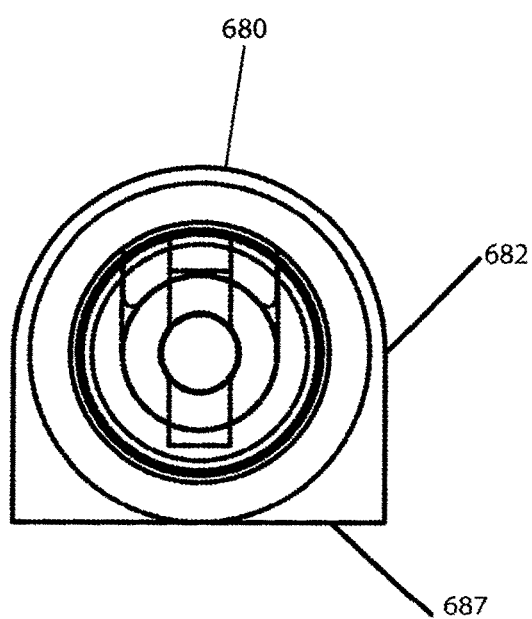
Figure 41:
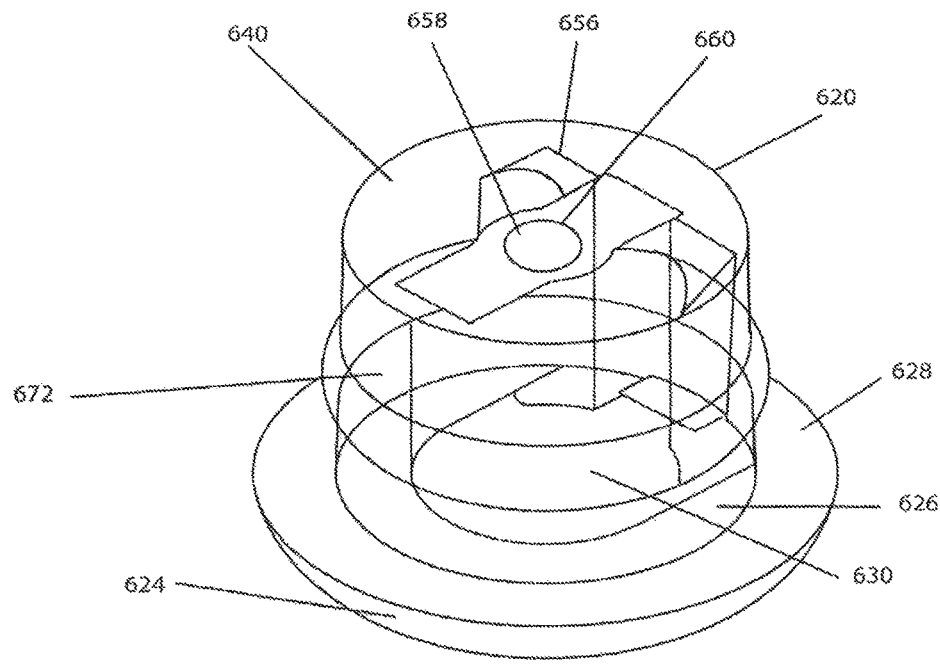
FIG. 41A is a perspective view of a cap assembly used with the sensor shown in FIG. 40A.
FIG. 41B is a bottom perspective view of the cap assembly shown in FIG. 41A.
FIG. 41C is a side elevational view of the cap assembly shown in FIG. 41A.
FIG. 41D is a top plan view of the cap assembly shown in FIG. 41A.
Figure 41:
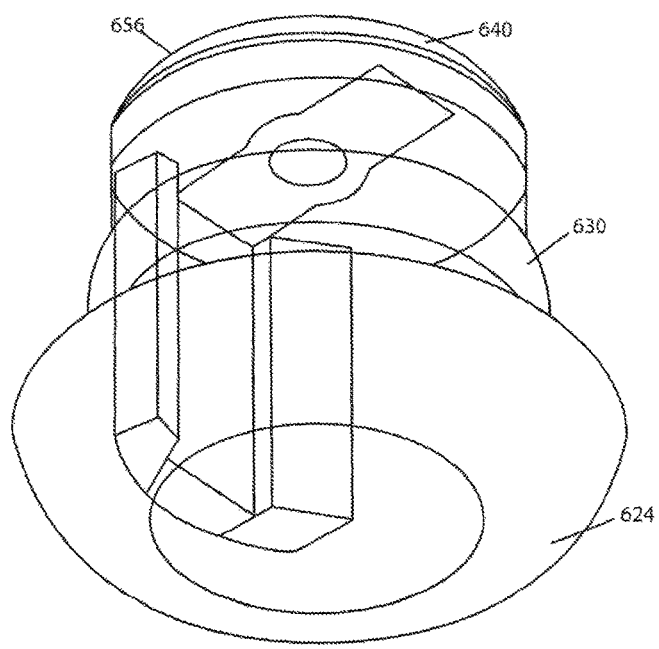
Figure 41:
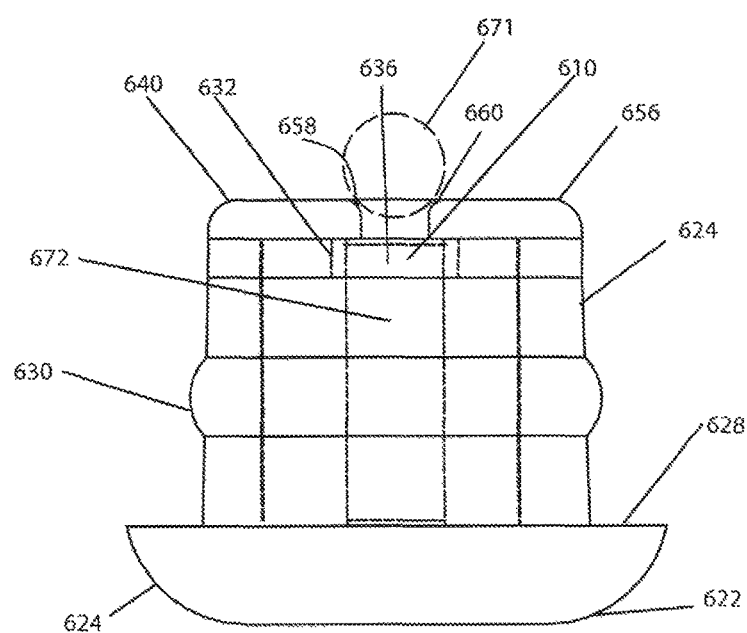
Figure 41:
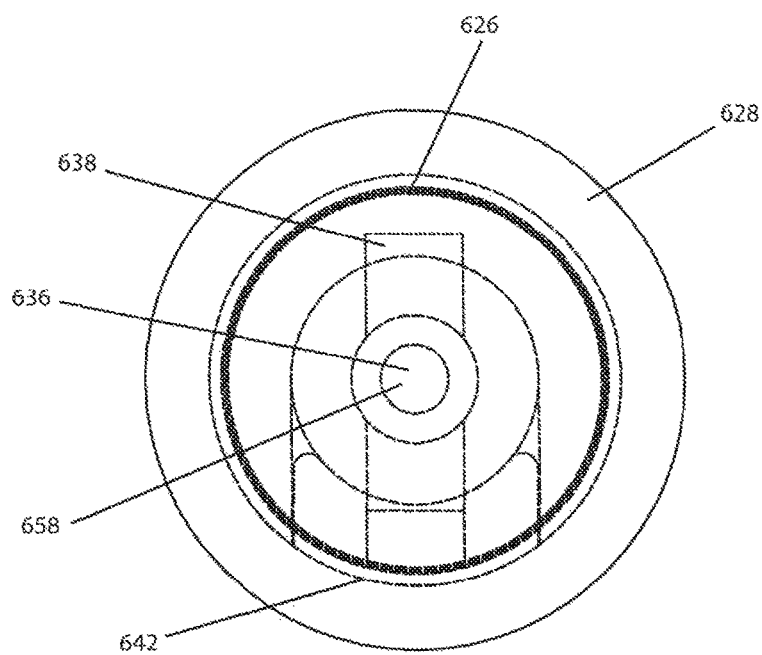
Figure 42:
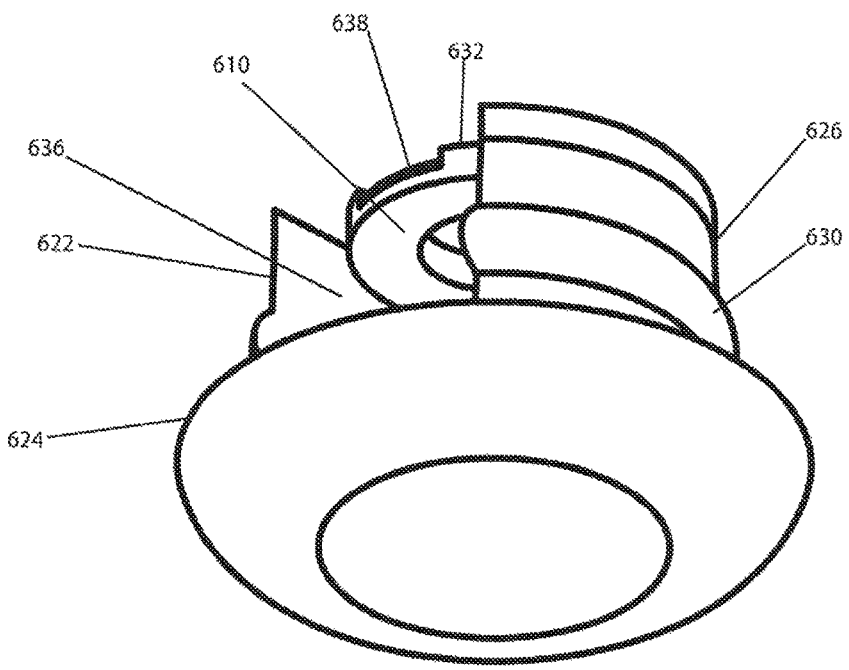
FIG. 42A is a perspective view of a first cap member used with the cap assembly shown in FIG. 41A.
FIG. 42B is a front elevational view of the first cap member shown in FIG. 42A.
FIG. 42C is a rear elevational view of the first cap member shown in FIG. 42A.
FIG. 42D is a top plan view of the first cap member shown in FIG. 42A.
Figure 42:
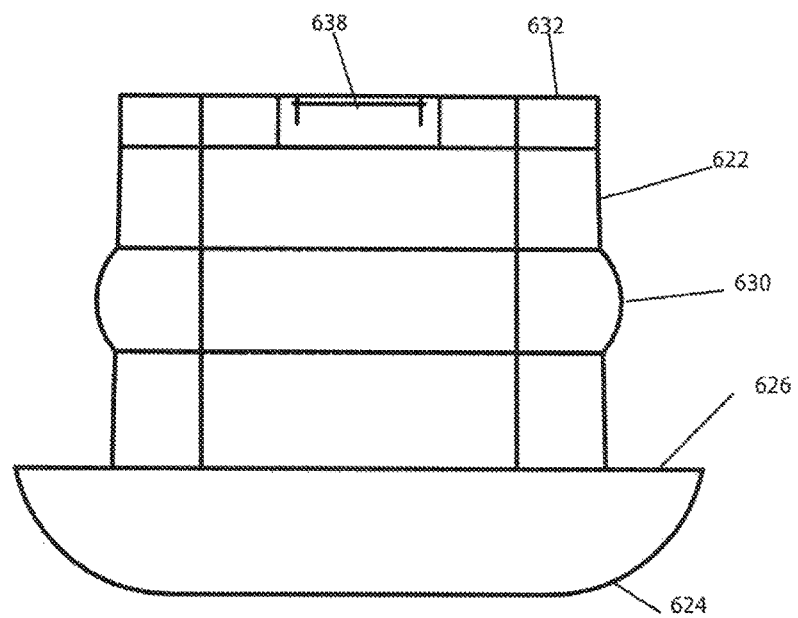
Figure 42:
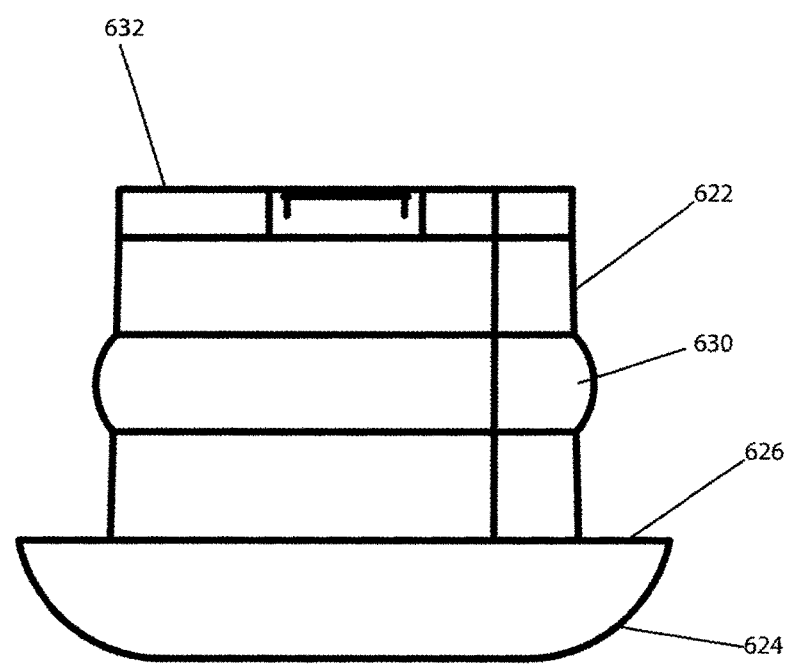
Figure 42:
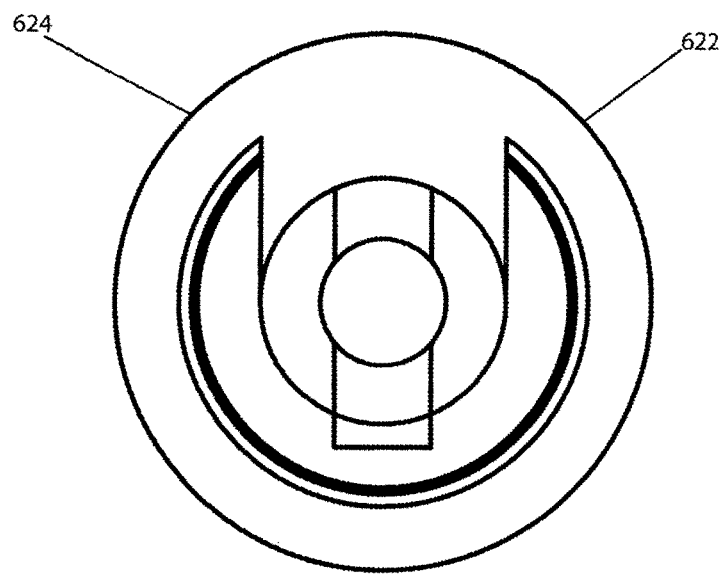
Figure 43:
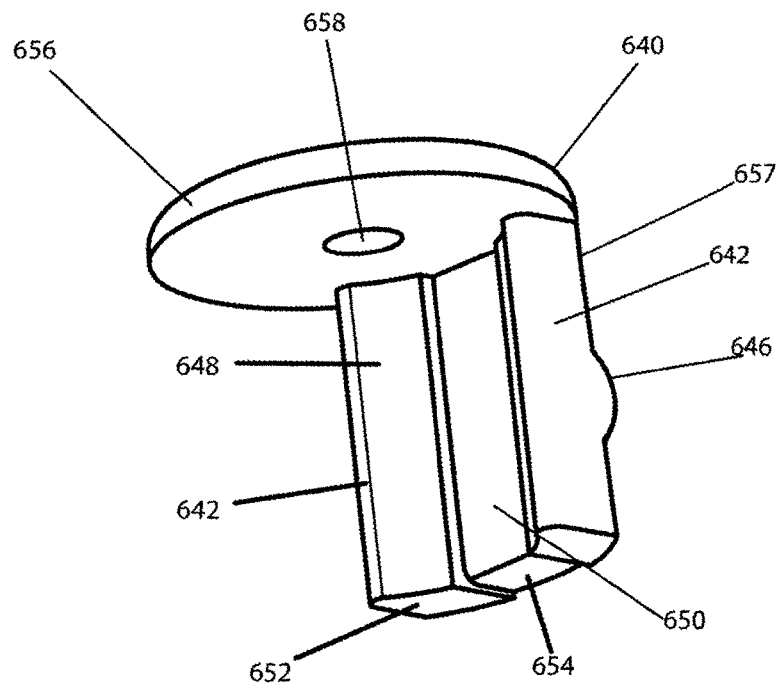
FIG. 43A is a perspective view of a second cap member used with the cap assembly shown in FIG. 41A.
FIG. 43B is a side elevational view of the second cap member shown in FIG. 43A.
FIG. 43C is a rear elevational view of the second cap member shown in FIG. 43A.
FIG. 43D is a front elevational view of the second cap member shown in FIG. 43A.
FIG. 43E is a top plan view of the second cap member shown in FIG. 43A.
Figure 43:
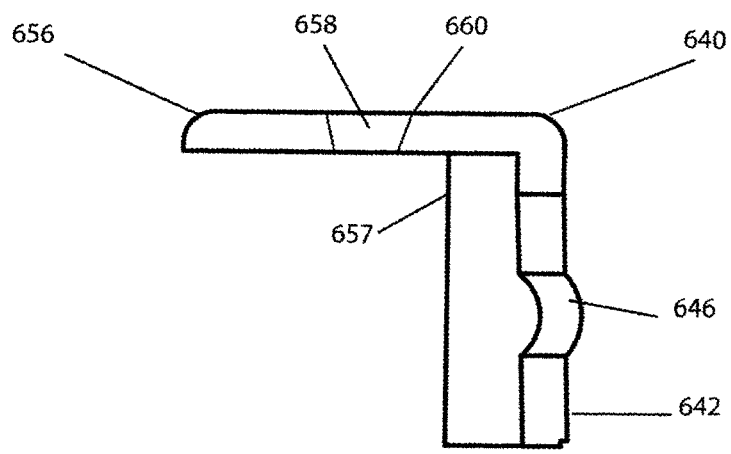
Figure 43:
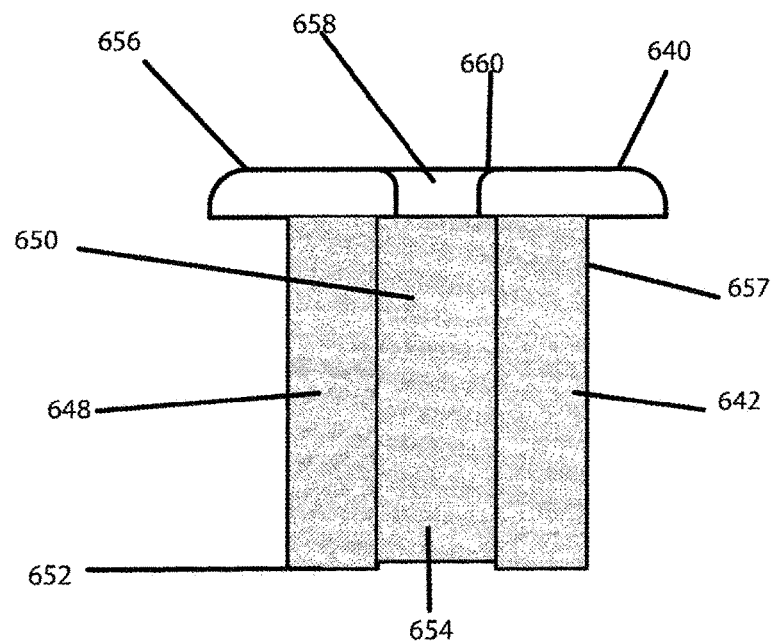
Figure 43:
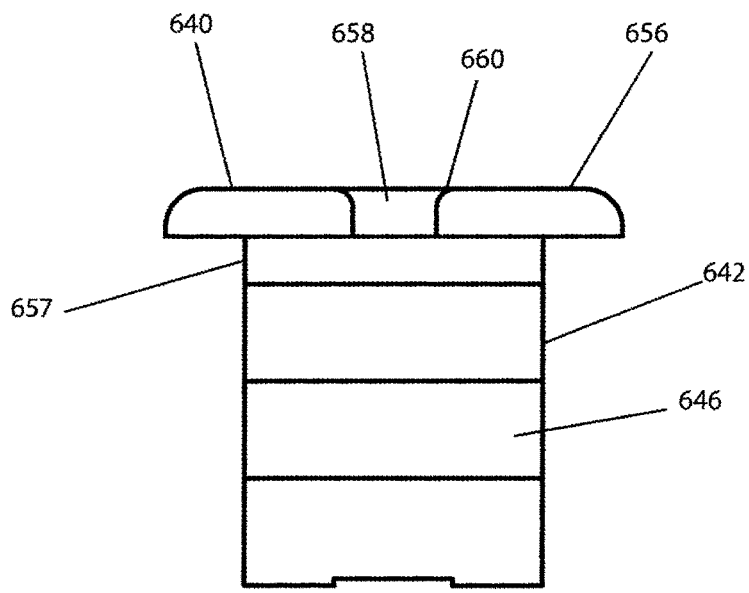
Figure 43:
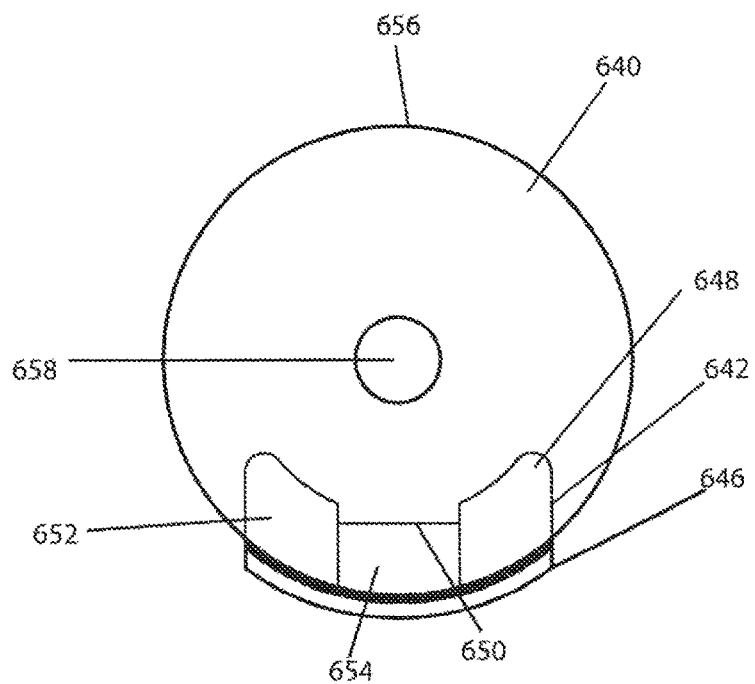

FIG. 30 shows a side elevational view of exterior wall 220 with a plurality of projections 240. Each projection 240 has a generally cylindrical base the tapers to a frustoconical tip for engagement with dye pellet 432.

Another alternative embodiment of a sensor 300 according to the present invention is shown FIGS. 31-38. Instead of exterior wall being removable from sensor 200, as described above, adhesive strip 302 as an opening in the middle thereof and rear wall 330 is removably insertable to the remainder of force sensor 300. Similar to sensors 400, 200, sensor 300 includes a plurality of projections 340 that extend inwardly toward the interior of sensor 300 such that, upon experiencing excessive G forces, dye pellet 432, impinges upon at least one of the plurality of projections 340 sufficiently to rupture dye pellet 432, allowing dye within dye pellet 432 to escape openings 342 to indicate the experience of the excessive G forces.

The removability of rear wall 330, similar to exterior wall 220 in sensor 200, allows a replacement dye pellet 432 to be inserted into sensor 300 in the event that dye pellet 432 inside sensor 300 ruptures.

Additionally, although not shown, the removability of exterior wall 220 in sensor 200 and rear wall 330 in sensor 300 allow sensors 200, 300 to be shipped with dye pellets 432, stored separately from sensors 200, 300 in order to reduce the risk of inadvertent rupture of dye pellet 432 during shipping. Alternatively, dye pellet 432 can be shipped inside sensor 200, 300 with the safety strip (not shown) inserted between dye pellet 432 and projections 240, 340 to prevent dye pellet 432 from inadvertently rupturing during shipping.

Referring back to FIGS. 12-14, a flavor strip 500 can be releasably adhered to the inside of mouthpiece 50. Flavor strip 500 can be infused with solid flavoring, such as, for example, mint flavoring, fruit flavoring, or other palatable flavoring, such that, when mouthpiece 50 is inserted into user's mouth, the user saliva activates flavor strip 500 so that the flavoring is released from flavor strip 500. A first side of flavor strip 500 that is attached to mouthpiece 50 includes an adhesive that releasably adheres flavor strip 500 to mouthpiece 50. A second side of flavor strip 500, opposite the first side, includes the flavoring. Optionally, wings 502, 504 can extend generally transversely from either end of flavor strip 500 and over the top of mouthpiece 50, such that, when the user bites down on mouthpiece 50, the user's top teeth bite down on wings 502, 504, both releasing further flavor from strip 500 as well as securing strip 500 onto the top of mouthpiece 50.

Alternatively, instead of a flavoring, strip 500 can be infused with power gel energy particles, electrolyte supplements, or other such energy or metabolism boosters to provide nutrition/energy to the user during use.

Referring now to FIGS. 40A-46, another alternative embodiment of a sensor 600 according to the present invention is shown. Referencing FIG. 44, relative locations of elements of sensor 600 are described. Sensor 600 includes a dye 602 that is stored in a first compartment 610. Dye 602 can be a dry dye, such as a powder or a pellet. Alternatively, dye 602 can be in liquid form. Dye 602 is used to indicate that a predetermined force upon sensor 600 has been exceeded.

Referring specifically to FIGS. 41A-43E, sensor 600 includes a cap assembly 620 surrounded by an outer sensor body 680. Cap assembly 620 is formed from a first cap member 622, shown in detail in FIGS. 42A-42D, and a second cap member 640, shown in detail in FIGS. 43A-43E.

First cap member 622 includes a base 624 and an arcuate side wall 626 extending outwardly from base 624. Again, referencing FIG. 44, base 624 is located at a top end of sensor 600. A flange 628 extends around side wall 626 at base 624. A detent 630 extends radially around side wall 626 about half way down the length of side wall 626 from base 624. A generally annular disc 632 extends from a bottom end 634 of side wall 626. First compartment 610 is formed by the annulus 636 of annular disc 632. Annular disc 632 also includes a radially extending slot 638 that extends across annulus 636 and away from side wall 626. Slot 638 is used to retain a pull tab 670 (shown in FIG. 44), as will be discussed in detail later herein.

Figure 44:
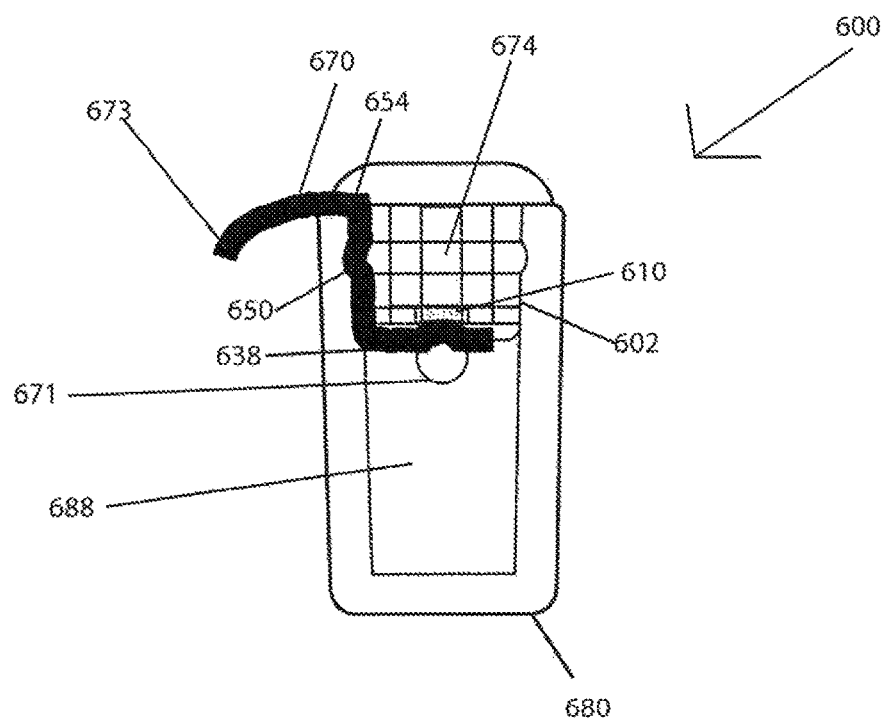
FIG. 44 is a side elevational view of the sensor shown in FIG. 40A, with a pull tab in the sensor non-operational position.

Referring to FIGS. 43A-43E, second cap member 640 includes a generally arcuate side wall 642 that, when second cap member 640 is mated with first cap member 622, forms a closed annular space 644, as shown in FIG. 40B. Side wall 642 includes a detent 646 that extends radially around side wall 642 about half way down the length of side wall 642 such that detent 646 and detent 630 form an annular ring. An interior face 648 of side wall 642 includes a vertical slot 650. Further, a bottom surface 652 of side wall 642 includes a radially extending slot 654 that is communication with vertical slot 650 such that, when second cap member 640 is mated with first cap member 622, slot 638 is in communication with vertical slot 650 such that pull tab 670 can extend through slot 638, vertical slot 650, and slot 654. As shown in FIG. 44, a free end 673 of pull tab 670 extends outwardly from sensor 600.

Referring also to FIG. 41C, second cap member 640 further includes an annular disc 656 that extends from a bottom end 657 of side wall 642. Annular disc 656 includes an annulus 658, smaller than annulus 636, having a chamfered edge 660. Chamfered edge 660 seats a magnetically attractive device 671, such as a steel ball bearing, so that annulus 658 is completely closed while magnetically attractive device 671 is seated in annulus 658.

Side wall 642 is longer than side wall 626 such that, when first cap member 622 and second cap member 640 are mated together, annular disc 656 extends under annular disc 632, Annulus 658 is generally axially aligned with annulus 636.

Both first cap member 622 and second cap member 640 can be constructed from impact resistant plastic such as EVA, PETG or optimally, polycarbonate plastic.

When first cap member 622 and second cap member 640 are mated together, forming cap assembly 620, a cavity 672 is formed between side walls 626, 642. Cavity 672 houses a magnetic member 674 (shown in FIGS. 44-46), such as, for example, a neodymium magnet and, by way of further example, a 6 pound pull neodymium magnet. The length of cavity 672 and the magnetic attraction of magnetic member 674 determine a predetermined force threshold level that retains magnetically attractive device 671 onto annulus 658. While dye 610 and pull tab 670 physically separate magnetic member 674 from magnetically attractive device 671, the magnetic field generated by magnetic member 674 sufficiently retains magnetically attractive member 671 onto annulus 658 until a force in excess of a predetermined force is applied to sensor 600.

Referring to FIGS. 40A-40D, outer sensor body 680 is generally hollow and can be constructed from a visually clear impact resistant plastic such as EVA, PETG, polycarbonate plastic, or other suitable transparent or translucent material. Outer sensor body 680 includes an open top end 682 that sealingly mates with flange 628 and a closed bottom end 684 at a distal end thereof. Proximate to open top end 682, a radial cavity 686 extends around a periphery of sensor body 680. Cavity 686 mates with detents 630, 646 to securely retain sensor body 680 onto cap assembly 620.

Optionally, outer sensor body 680 can include a flat surface 687 (shown in FIG. 40D) so that sensor 680 can be fixedly mounted to a structure (not shown) along flat surface 687.

Sensor body 680 contains a clear liquid 688, such as water, propylene glycol, ethanol alcohol, a diluted combination of ethanol alcohol and propylene glycol or other suitable liquids so the liquid can withstand sub-freezing temperatures without itself freezing.

To activate sensor 600, pull tab 670 must be removed from sensor 600 by pulling free end 673 of pull tab 670

Figure 45:
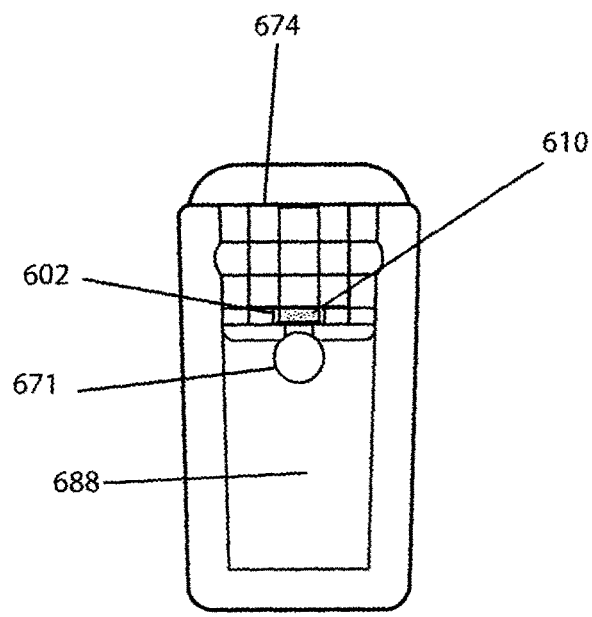
FIG. 45 is a side elevational view of the sensor shown in FIG. 40A, with the sensor prior to activation.

(shown in FIG. 44) to remove pull tab 670 from sensor 600 so that sensor 600 looks like the sensor shown in FIG. 45. Once pull tab 670 is removed, sensor 600 is operable and ready for activation.

Figure 46:
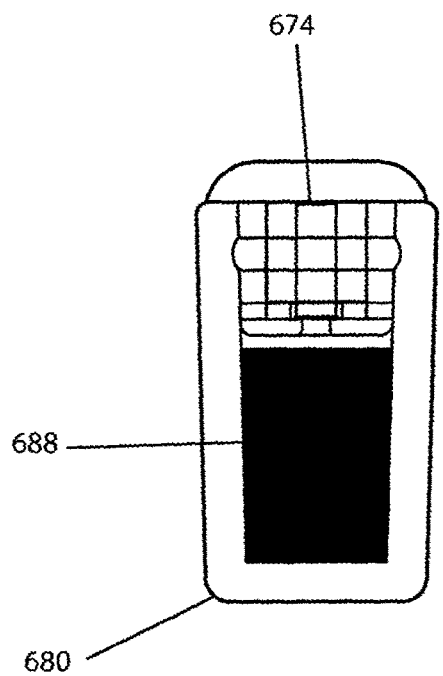
FIG. 46 is a side elevational view of the sensor shown in FIG. 40A, with the sensor having been activated.

When a predetermined force level upon sensor 600 has been exceeded, sensor 600 is activated and magnetically attractive device 671 is displaced from the magnetic field and away from annulus 658, releasing dye 602 into outer sensor body 680 where liquid 688 and dye 602 combine for a visual reaction changing the color of liquid 688, as shown in FIG. 46. This indicates the designated force level has been exceeded.

Sensor 600, along with the other sensors described and shown herein, can used for sports/recreation, labor and construction, shipping, and aeronautics/aerospace applications and can be integrated or attached to devices such as a variety of sporting equipment, helmets, hard hats, shipping boxes, shipping containers, aircraft landing gear, and other devices for which it is desired to know whether excess of a predetermined force has been exerted on the device. Further, multiple sensors of those described and shown herein can also be used together for a more comprehensive coverage of directional axes by placing the sensors along different axes.

It will be further understood that various changes in the details, materials, and arrangements of the parts which have been described and illustrated in order to explain the nature of this invention may be made by those skilled in the art without departing from the scope of the invention as expressed in the following claims.

I claim:

1. An impact sensor comprising:
   a hollow sensor body having an open end and a closed end, the closed end defining a chamber;
   a cap extending over the open end, the cap having:
      a wall extending into the sensor body, the wall defining a compartment; and
      an annular disc connected to the wall, the annular disc having a through-opening formed therein;
   a first magnetic member located proximate to the open end of the sensor body;
   a second magnetic member magnetically attracted to the first magnetic member and covering the through-opening;
   a colored fluid in the compartment; and
   a removable pull tab between the second magnetic member and the through opening.

2. The impact sensor according to claim 1, wherein the colored fluid is between the first magnetic member and the second magnetic member.

3. The impact sensor according to claim 1, wherein the cap comprises a first cap member forming a first wall portion of the wall and a second cap member forming a remaining wall portion of the wall.

4. The impact sensor according to claim 1, wherein the sensor body includes a radial cavity extending around a periphery of thereof, and wherein the cap comprises a detent sized to fit into the radial cavity.

5. The impact sensor according to claim 1, wherein the first magnetic member magnetically attracts the second magnetic member with a predetermined force.

6. The impact sensor according to claim 5 wherein, when a force exceeding the predetermined force is applied to the sensor, the second magnetic member is moved away from the through-opening.

7. The impact sensor according to claim 6, wherein, when the second magnetic member is moved away from the through-opening, the dye is able to move into the chamber.

8. The impact sensor according to claim 1, further comprising a liquid disposed in the chamber.

9. The impact sensor according to claim 1, wherein the pull tab comprises a free end extending outwardly of the sensor body.

10. An impact sensor comprising:
    a hollow body having a chamber therein;
    a wall being disposed in the chamber;
    an annular disc attached to the wall such that the wall and the annular disc define a chamber, the annular disc having a through-opening formed therein;
    a dye disposed in the chamber;
    a magnetically attractive ball covering the through-opening; and
    a magnetic element biasing the ball over the through-opening.

11. The impact sensor according to claim 10, further comprising a liquid in the chamber between the wall and the body.

12. The impact sensor according to claim 10, further comprising a pull tab removably located between the magnetically attractive ball and the through-opening.

13. The impact sensor according to claim 10, wherein the magnetically attractive element is selected to provide a predetermined magnetic force between the magnetically attractive element and the magnetically attractive ball.

14. The impact sensor according to claim 10, wherein the dye comprises a dry powder.

15. The impact sensor according to claim 10, wherein the magnetically attractive element comprises a neodymium magnet.

16. The impact sensor according to claim 10, wherein the magnetically attractive ball comprises a steel ball.

17. The impact sensor according to claim 10, wherein the wall comprises a first wall portion and a second wall portion.

18. The impact sensor according to claim 10, wherein the body is constructed from a visually clear material.

19. The impact sensor according to claim 10, wherein the magnetic attraction between the magnetically attractive element and the magnetically attractive ball determines a predetermined force threshold level that retains the magnetically attractive ball over the through-opening.

* * * * *